United States Patent
van der Laan et al.

(10) Patent No.: US 12,007,246 B2
(45) Date of Patent: Jun. 11, 2024

(54) GENERATING SEGMENT DATA

(71) Applicant: TomTom Traffic B.V., Amsterdam (NL)

(72) Inventors: Antoine Carl van der Laan, Dronten (NL); Rene Beier, Berlin (DE); Peter Mieth, Berlin (DE)

(73) Assignee: TomTom Traffic B.V., Amsterdam (NL)

(*) Notice: Subject to any disclaimer, the term of this patent is extended or adjusted under 35 U.S.C. 154(b) by 12 days.

(21) Appl. No.: 17/624,496

(22) PCT Filed: Jul. 13, 2020

(86) PCT No.: PCT/EP2020/069723
§ 371 (c)(1),
(2) Date: Jan. 3, 2022

(87) PCT Pub. No.: WO2021/013601
PCT Pub. Date: Jan. 28, 2021

(65) Prior Publication Data
US 2022/0357180 A1  Nov. 10, 2022

(30) Foreign Application Priority Data
Jul. 19, 2019 (GB) ..................... 1910274

(51) Int. Cl.
*G01C 21/34* (2006.01)
*G01C 21/00* (2006.01)

(52) U.S. Cl.
CPC ..... *G01C 21/3826* (2020.08); *G01C 21/3453* (2013.01); *G01C 21/3844* (2020.08)

(58) Field of Classification Search
None
See application file for complete search history.

(56) References Cited

U.S. PATENT DOCUMENTS

2008/0004797 A1  1/2008  Katzer
2014/0012502 A1  1/2014  Joshi et al.
(Continued)

FOREIGN PATENT DOCUMENTS

EP  1873493 A1  1/2008
WO  2010073053 A1  7/2010

OTHER PUBLICATIONS

International Search Report dated Jun. 10, 2020 for International patent application No. PCT/EP2020/069723.

*Primary Examiner* — Eileen M Adams
(74) *Attorney, Agent, or Firm* — Park, Vaughan, Fleming & Dowler LLP

(57) ABSTRACT

A method of generating a scenic rating for segments of an electronic map involves obtaining probe data relating to the movement of a plurality of devices with respect to time in the area, and, for each one of a plurality of segments of the electronic map; identifying a set of positional data relating to the movement of devices along the navigable element represented by the segment, filtering the identified set of positional data relating to the movement of devices along the navigable element represented by the segment based on mode of transport to obtain one or more subset of the identified positional data relating to the movement of devices along the element represented by the segment which may be expected to relate to traversals of the navigable element for recreational purposes, using the or each obtained subset of the positional data to obtain one or more scenicity parameter which may be used in determining a scenic rating for the segment indicative of a scenicity of the navigable element represented by the segment, and using the one or more obtained scenicity parameter to determine a scenic rating for the segment.

21 Claims, 10 Drawing Sheets

(56) References Cited

U.S. PATENT DOCUMENTS

| | | |
|---|---|---|
| 2014/0046584 A1 | 2/2014 | Aben et al. |
| 2015/0066355 A1* | 3/2015 | Siegel ................ G01C 21/3492 |
| | | 701/410 |
| 2015/0160030 A1 | 6/2015 | Costello |
| 2015/0251053 A1* | 9/2015 | Hoffman ............ A63B 24/0062 |
| | | 700/91 |
| 2018/0112995 A1 | 4/2018 | Bortolussi et al. |
| 2018/0252541 A1 | 9/2018 | Kesting et al. |
| 2018/0306600 A1 | 10/2018 | Nicolaas et al. |

* cited by examiner

GENERATING SEGMENT DATA

FIELD OF THE INVENTION

The invention relates to a method of and an apparatus for determining a scenic rating for segments of an electronic map. The segments represent navigable elements of a network of navigable elements within a geographic area covered by an electronic map, and a scenic rating is determined in respect of each one of one or more segments of the electronic map. The scenic rating for a segment is indicative of the scenicity of the navigable element represented by the segment.

BACKGROUND OF THE INVENTION

Map data for use by navigation applications is specially designed to be used by route guidance algorithms, typically using location data from a positioning e.g. GPS or GNSS system. For example, roads can be described as lines, i.e. vectors (e.g. start point, end point, direction for a road, with an entire road being made up of many hundreds of such segments, each uniquely defined by start point/end point direction parameters). A map is then a set of such road vectors, data associated with each vector (speed limit, travel direction, etc), plus points of interest (POIs), plus road names, plus other geographic features like park boundaries, river boundaries, etc, all of which are defined in terms of vectors. All map features (e.g. road vectors, POIs, etc.) are typically defined in a co-ordinate system that corresponds with or relates to the coordinate system of the positioning system e.g. GPS system, enabling a position as determined through the positioning system to be located onto the relevant road shown in a map and for an optimal route to be planned to a destination.

Navigation applications may be implemented by any suitable navigation device. Such navigation devices, may for example, include dedicated navigation devices or any mobile device on which a suitable navigation application is executed, or may be implemented using an integrated in-vehicle navigation system.

A navigation application typically generates a route to a destination by exploring segments of an electronic map representative of navigable elements of the navigable network from a position on a segment representative of a starting location of interest e.g. a current position using a search algorithm having an associated cost function. The cost function may be obtained based upon provided information indicative of the type of route required, such as "fastest" or "eco" (i.e. most fuel/energy efficient). The search algorithm may be arranged to determine a least cost route e.g. a shortest path in terms of time or distance, and/or which minimises energy expenditure etc. depending upon the cost function used. Some navigation applications may enable a user to set a preference for a functional road class or road hierarchy level.

Typically, each map segment has associated therewith speed data for that road segment which gives an indication of the speed at which travel may occur by the applicable mode of transport along the navigable element represented by that segment and is an average speed generated by the party that produced the map data. The speed data is used by route planning algorithms when planning a route using the map data. Map segments may be associated with average speed data in respect of different time periods e.g. times of the day and/or days of the week etc. Navigation systems may take into account live traffic conditions or other factors affecting the traversability of road segments. For example, where a current speed of travel along a navigable element represented by a segment differs from that expected for the element based on historical data for the relevant time, the speed data for the segment representing the element may be modified, such that the current live speed data for the element is considered when a route algorithm explores segments of the map to generate a route. Similarly, road closures may be taken into account. For example, the cost associated with traversing a segment may be set prohibitively high for a segment representing a closed road element such that it is less likely to be included in a generated route.

A navigation application may be arranged to monitor conditions on the navigable network and update an estimated time of arrival and/or suggest alternative e.g. faster routes, should conditions change after navigation along a route has commenced.

The Applicant has realised that while factors used conventionally in generating a route through a navigable network using electronic map data e.g. functional road class (FRC), traversal times/speeds for segments, traffic conditions etc. may enable an efficient route to be determined based upon objective criteria, such as time, distance or energy efficiency, in some cases a user may wish to generate a route that they can expect to find enjoyable. There is a need for methods and systems which may enable routes to be generated which can be expected to be found enjoyable by users.

SUMMARY OF THE INVENTION

In accordance with a first aspect of the invention there is provided a (computer implemented) method of generating a scenic rating for segments of an electronic map, the segments representing navigable elements of a network of navigable elements within a geographic area covered by the electronic map, the method comprising:

obtaining positional data relating to the movement of a plurality of devices with respect to time in the area;
and, for each one of a plurality of segments of the electronic map;
identifying a set of positional data relating to the movement of devices along the navigable element represented by the segment,
filtering the identified set of positional data relating to the movement of devices along the navigable element represented by the segment based on one or more criteria to obtain one or more subset of the identified positional data relating to the movement of devices along the element represented by the segment which may be expected to relate to traversals of the navigable element for recreational purposes, wherein the criteria include mode of transport with which the devices are associated and/or a time of traversal of the element represented by the segment,
using the or each obtained subset of the positional data to obtain one or more scenicity parameter which may be used in determining a scenic rating for the segment indicative of a scenicity of the navigable element represented by the segment,
and using the one or more obtained scenicity parameter to determine a scenic rating for the segment;
the method further comprising, for at least some of the plurality of segments for which a scenic rating is determined, generating data indicative of the obtained scenic rating, and associating data indicative of the scenic rating with the segment to which it relates.

In accordance with the invention, therefore, positional data obtained from devices, and relating to the movement of the devices with respect to time in an area covered by the electronic map, is obtained, and, for each one of a plurality of segments of the electronic map, that positional data relating to the movement of devices along the navigable element represented by the segment is identified. For each segment considered, the positional data relating to the element represented by the segment is filtered based on one or more criteria to obtain one or more subset of the positional data relating to the movement of devices along the navigable element represented by the segment. The one or more criteria include one or both of mode of transport with which the devices are associated and a time of traversal of the element represented by the segment. Such subset(s) of positional data are deemed more likely to relate to movements along the element represented by the segment due to scenic properties of the element i.e. for recreational purposes. The or each subset of the positional data is used to obtain one or more parameter for use in determining a scenicity rating of the segment. The one or more obtained scenicity parameter in respect of a segment is used to determine a scenic rating therefor, and, for at least some of the segments for which a scenic rating is determined, data is generated indicative of the obtained scenic rating for the segment, and data indicative of the scenic rating is associated with the segment.

It has been recognised that travel along navigable elements in certain time periods, e.g. at certain of day and/or on certain days of the week, may be more likely to be associated with recreational travel. Likewise, travel along elements by certain modes of transport e.g. motorcycles may be more likely to relate to recreational travel. By filtering positional data for elements represented by segments to identify traversals falling under one or both of these categories, conclusions may be drawn about the scenicity of the element represented by the segment, enabling a scenic rating for segment (indicative of a scenicity of the element represented by the segment) to be determined. The present invention provides a way of objectively quantifying scenicity of segments/elements. As the determination is made using positional data indicative of traversals of elements of the navigable network, the determination may be readily updated in a dynamic manner based upon data indicative of the movement of devices along the elements, allowing account to be taken of changes which may impact on scenicity of elements e.g. changes in road surface of the element, opening of the element to other classes of vehicle, changes that may impact views from the element etc. The invention enables a scenic rating for a segment to be determined based on observed actual movement of devices in the area, enabling the automated determination of scenicty data, and avoiding the need for subjective assessment of element properties.

The method of the present invention is performed in relation to each one of a plurality of segments of the electronic map. The segments that are considered may be any desired segments of the electronic map, and may comprise all segments representing navigable elements of the navigable network in a portion of the navigable network being considered, or a subset thereof. For example, the segments considered may be those segments of a portion of the electronic map that is displayed to a user, or a subset thereof.

The step of identifying, for each navigable segment considered, the positional data relating to the movement of devices along a navigable element represented by the segment of the electronic map may be carried out in any suitable manner, and may be carried out by reference to the electronic map data indicative of the navigable segment representing the navigable element of the network. The method may involve the step of matching positional data relating to the movement of devices in a geographic region including the network of navigable elements to at least the or each navigable segment of the electronic map that is being considered in accordance with the invention. Matching the obtained positional data relating to the movement of devices to a segment being considered may be performed by reference to a position associated with the segment representing the navigable element. The position associated with the segment may be an extended position, such as an area covered by the segment. Any positional data relating to a position of a device within, or within a predefined proximity to the position e.g. area of the segment may be considered to relate to travel along the element represented by the segment. The position associated with a segment is a position associated with the segment according to the electronic map. The step of identifying positional data relating to the movement of devices along a navigable element represented by a segment may comprise filtering the obtained positional data.

The method may comprise displaying a representation of the identified positional data relating to the movement of devices along navigable elements represented by the or each segment being considered on a representation of the electronic map. The method may comprise receiving an indication of the one or more criteria upon which the identified set of positional data is to be filtered to obtain a given subset of the positional data e.g. mode of transport and/or time of traversal of the segment or any further criteria being considered, and displaying a representation of the obtained subset of the positional data relating to the or each segment being considered on a representation of the electronic map.

The step of filtering the identified set of positional data to obtain one or more subset of the identified positional data relating to the movement of devices along the element represented by the segment which may be expected to relate to traversals of the element for recreational purposes is carried out in respect of the or each segment being considered. Any of the steps described herein may be performed in relation to a segment may be performed in relation to any further segment(s) considered.

For the or each segment considered, the or each subset of positional data obtained in accordance with the invention relates to the movement of devices along the element represented by the segment which may be expected to relate to traversals of the element for recreational purposes, and is obtained by filtering the identified set of positional data based on one or more criteria, which criteria include one or both of a mode of transport with which the devices are associated and a time of traversal of the element represented by the segment.

Where, in obtaining a subset of the data, the identified positional data relating to the movement of devices along a navigable element represented by a segment is filtered based on mode of transport, the data is filtered such that the subset of the positional data obtained relates to the movement of devices along the element associated with one or more modes of transport which may be expected to be associated with recreational travel. It will be appreciated that the subset may relate to only one mode of transport expected to be associated with recreational travel, or multiple modes of transport e.g. all modes of transport expected to be associated with recreational travel. This will depend upon the way in which it is desired to determine the scenic rating. For example, this may be based on a scenicity parameter indicative of an overall use fraction by recreational modes of transport, or based on one or more scenicity parameter indicative of an individual use fraction in respect of a specific recreational mode of transport.

The one or more modes of transport expected to be associated with recreational travel may be one or more selected modes of transport forming a subset of all of the modes of transport with which devices traversing the element are associated (according to the identified set of positional data). For example, the data may be filtered such that the subset of positional data obtained relates to the movement of devices associated with non-commercial vehicles or pedestrians. In some embodiments, the subset of positional data obtained relates to the movement of devices associated with one or more of; pedestrians, motorcycles, electric vehicles, cars, or bicycles. The modes of transport may correspond to types or classes of vehicle. In some embodiments the method may comprise filtering the identified positional data to exclude data relating to the movement of devices associated with any type of vehicle from the obtained subset which is not expected to be associated with recreational travel. Thus, the method may comprise filtering the positional data to exclude data relating to the movement of devices associated with at least commercial vehicles from the obtained subset. For example, the filtering may be performed such that positional data relating to the movement of devices associated with trucks and vans is excluded. It will be appreciated that data relating to the movement of pedestrians may or may not be included in the subset, e.g. depending upon whether the obtained positional data which is filtered relates to the movement of devices associated with (only) vehicles with respect to time. Depending upon the context it may or may not be desired to include data relating to pedestrians.

Where, in obtaining a subset of the identified set of positional data, the positional data relating to the movement of devices along a navigable element represented by a segment is filtered based on a time of traversal of the segment, the data may be filtered such that the subset obtained relates to the movement of devices along the navigable element represented by the segment in one or more given time period expected to be associated with recreational travel. Where multiple given time periods are considered, these should be non-overlapping. It will be appreciated that the subset may relate to only one given time period expected to be associated with recreational travel, or multiple given time periods e.g. all time periods to be expected to be associated with recreational travel. This will depend upon the way in which it is desired to determine the scenic rating. For example, this may be based on a scenicity parameter indicative of an overall use fraction for all given time periods associated with recreational travel, or based one or more scenicity parameter indicative of an individual use fraction in respect of a specific given time period associated with recreational travel. Preferably any given subset of the identified set of positional data is based on consideration of movement of devices in only one given time period (which may be a recurrent time period).

The or each given time period may be a recurring time period, such as a time of day and/or day of the week. The or each given time period is a time period in which movement along the navigable element may be expected to relate to travel for recreational purposes. A given time period may, for example, be a time range, date range, day of the week, time of the day range or combination thereof. For example, the time period may be a weekend, or a time period at a weekend, or other time period not associated with non-recreational e.g. commuter travel, such as an off peak time period fora given day. The data may be filtered to exclude data relating to the movement of devices along the navigable element represented by the segment in one or more given time periods expected to be associated with non-recreational e.g. commuter travel, e.g. occurring during weekdays, and/or during commuter times.

In some embodiments, one or more subset of the identified set of positional data is obtained by filtering based on both mode of transport and time of traversal. This may be achieved e.g. by filtering first based on time of traversal, and then by mode of transport. However, any suitable arrangement may be used, involving sequential filtering by each criteria in any order, or simultaneous filtering by multiple criteria.

Where the one or more criteria used to obtain a given subset of the positional data expected to relate to traversals of the element for recreational purposes do not include a criterion relating to time of traversal of the segment e.g. where they relate only to mode of transport, it may be desirable to limit the obtained subset of data based on a time period of interest. The obtained subset of the identified positional data may thus relate to the movement of devices along the element represented by the segment which may be expected to relate to traversals of the navigable element for recreational purposes in a time period of interest. The time period of interest is a time period which it is desired to consider, and is not chosen to correlate to a time period expected to be associated with recreational travel. This may be performed by limiting the identified set of positional data upon which the obtained subset of data is based using the time period of interest, or by further filtering the identified set of positional data using the time period of interest (before, during or after obtaining the subset). This may exclude older data, for example, and/or may be useful in providing a subset of data which can be compared more easily to a reference set of data when determining the scenic rating in certain embodiments, as discussed below. Where a reference set of positional data is obtained, the reference set of positional data may then be based on a corresponding time period of interest. A time period of interest may also be used to enable additional data points relating to a given traversal of a segment by a device to be identified and disregarded when determining a count of traversals. For example, additional data points relating to the same device in the identified set of positional data in respect of the time period of interest may be removed from further consideration. The use of a time period of interest is, however, not essential. For example, all available positional data from the identified set of positional data relating to movement of devices along the navigable element may be used in obtaining the subset of positional data (and providing any reference set of data).

It will be appreciated that other criteria may be taken into account in obtaining a subset of the positional data. This may enable the subset of positional data to be refined, increasing the likelihood that it relates to traversals occurring for recreational purposes. The obtained subset of positional data relating to the movement of devices along an element may be limited to positional data relating to the movement of devices that occurred under weather conditions conducive to recreational travel. This may be achieved by limiting the identified set of positional data relating to the movement of devices along the navigable element using a suitable "weather window" e.g. to exclude data relating to traversals which occurred under weather conditions not considered conducive to recreational travel e.g. wet weather. Such embodiments may be performed using weather data indicative of weather conditions on a navigable element at the time of a particular traversal by a device. Alternatively or additionally, limiting of the positional data based on weather conditions may be carried out as part of the filtering step. A subset of data filtered by reference to mode of transport and/or time of traversal may be further refined by filtering in relation to weather conditions. Such weather related criteria may include positive criteria e.g. that the weather is sunny, or negative criteria e.g. that the weather is not adverse to recreational activities e.g. is not wet.

The method involves using the or each obtained subset of positional data in respect of an element represented by a segment being considered to obtain one or more scenicity parameter which may be used in determining a scenic rating for the segment being considered, and indicative of the scenicity of the element represented by the segment.

The method may comprise obtaining the one or more scenicity parameter for the segment based on the or each obtained subset of positional data for the element represented by the segment and, in respect of each obtained subset of positional data, a reference set of positional data relating to the movement of devices along the navigable element (represented by the segment). The same reference set of positional data may be used with multiple obtained subsets of positional data e.g. where subsets are obtained in respect of different modes of transport, the same reference set of positional data, e.g. based on traversals of the element by all modes of transport, may be used in association with each subset. Where an obtained subset is obtained by filtering using a time of traversal, alone or together with mode of transport, the reference set of positional data is typically specific to that subset of positional data i.e. relating to an appropriate reference time period.

In embodiments in which one or more subset of positional data is obtained by filtering the identified set of positional data based on mode of transport with which the devices are associated, the obtained subset of positional data relating to the movement of devices along the navigable element may be obtained by filtering the identified set of positional data relating to the movement of devices along the navigable element based on mode of transport with which the devices are associated, wherein the obtained subset of positional data comprises data relating to the traversal of the element by devices associated with one or more selected mode of transport forming a subset of all modes of transport with which devices traversing the element are associated. A reference set of positional data for the (or each such subset of positional data) may comprise data relating to the movement of all devices along the navigable element i.e. by devices associated with all modes of transport with which devices traversing the element are associated. The reference set of positional data may, for example, correspond to the identified set of positional data for the navigable element upon which the filtering step is based. Where the subset of positional data is in respect of a time period of interest, the reference set of positional data may be in respect of the same time period of interest. This may be achieved using an identified set of positional data which is in respect of the given time period of interest. Of course, it is not necessary that the reference set of positional data for use with an obtained subset of positional data based on mode of transport necessarily corresponds to traversals by all modes of transport. For example, a reference set of positional data could be based upon positional data relating to a subset of modes of transport expected to relate to non-recreational e.g. commuting travel.

In embodiments in which one or more subset of positional data is obtained by filtering the identified set of positional data based on a time of traversal of the element, and the or each such subset obtained relates to the movement of devices along the navigable element represented by the segment in one or more given time period expected to be associated with recreational travel, a reference set of positional data may be obtained in respect of each such subset of positional data, each reference set of data comprising positional data relating to the movement of devices along the element in a reference time period expected to be associated with non-recreational travel along the element. The reference time period for a given subset of the positional data that is in respect of such a reference time period should be comparable in size to the given time period upon which the subset of positional data is based e.g. of the same size. The reference time period may be a recurring time period where the given time period is a recurring time period. Of course a reference set of positional data for use in embodiments relating to subsets based upon time of traversal may be obtained in other manners. For example, a reference set of positional data might correspond to the identified set of positional data i.e. positional data relating to all traversals of the element.

In general, the method may comprise, for each subset of positional data obtained relating to traversals of the element (by devices) expected to relate to recreational travel, determining a count of traversals of the element (by devices) according to the obtained subset of positional data, determining a count of traversals of the element according to the applicable reference set of positional data, and determining a scenicity parameter for the segment using the count of traversals of the element according to the obtained subset of positional data and the count of the traversals of the element according to the applicable reference set of positional data. The method may comprise determining a scenicity parameter for the segment representing the element based on a ratio of the count of traversals of the element according to the obtained subset of positional data and the count of the traversals of the element according to the applicable reference set of positional data. The scenicity parameter may be the ratio itself, or any data allowing such a ratio to be determined, e.g. a percentage, fraction etc.

A count of traversals of an element as used herein refers to a count of traversals of the element by devices according to the applicable (sub)set of data being considered.

Where one or more subset of the identified positional data is obtained comprising data relating to the traversal of the element by devices associated with one or more selected modes of transport (expected to be associated with recreational travel) forming a subset of all modes of transport (to which the identified positional data relates), the method may comprise, for each such subset of the positional data, determining a count of traversals of the element according to the obtained subset of positional data (i.e. a count of traversals by (devices associated with) the one or more selected modes of transport), determining a count of traversals of the element (by devices) according to the applicable reference set of positional data, and determining a scenicity parameter for the segment representing the element based on the count of traversals of the element according to the obtained subset of positional data and the count of the traversals of the element according to the reference set of positional data. The scenicity parameter may be based on a ratio of the count of traversals of the element according to the obtained subset of positional data and the count of the traversals of the element according to the applicable reference set of positional data. The scenicity parameter may be the ratio itself, or any data based on such a ratio, e.g. a percentage, fraction etc.

The method may extend to the step of determining the ratio of counts of traversals of an element, in any of the aspects or embodiments of the invention in which a scenicity parameter is determined based on such a ratio.

It will be appreciated that where each subset of the identified positional data obtained relating to the traversal of the element by devices associated with one or more selected modes of transport (expected to be associated with recreational travel) is in respect of a single mode of transport, a plurality of such subsets of positional data may be obtained in respect of different selected modes of transport (expected to be associated with recreational travel). The method may then comprise determining, in respect of each selected mode of transport, a scenicity parameter based on a ratio of a count of traversals of the element by devices associated with the selected mode of transport according to the applicable subset of positional data in respect of that mode of transport, and a count of traversals of the element by devices associated with all modes of transport e.g. according to the identified set of positional data.

The method may comprise, in respect of each subset of positional data in respect of a given selected mode of transport, determining a count of traversals of the element according to the subset of positional data, determining a count of traversals of the element according to an applicable reference set of positional data, and determining a scenicity parameter based on a ratio of the count of traversals of the element for the selected mode of transport according to the obtained subset of positional data and the count of the traversals of the element according to the reference set of positional data.

Where one or more subset of the identified positional data is obtained comprising data relating to the traversal of the element by devices in a given time period (expected to be associated with recreational travel), the method may comprise, for each such subset of the positional data, determining a count of traversals of the element according to the obtained subset of positional data (i.e. a count of traversals by devices in the given time period), determining a count of traversals of the element based on the applicable reference set of positional data, and determining a scenicity parameter for the segment using the count of traversals of the element according to the obtained subset of positional data and the count of the traversals of the element according to the applicable reference set of positional data. The scenicity parameter may be based on a ratio of the count of traversals of the element according to the obtained subset of positional data (relating to the given time period) and the count of the traversals of the element according to the applicable reference set of positional data.

In accordance with the invention in any of its aspects or embodiments, the method further comprises using the one or more obtained scenicity parameters to determine a scenic rating for the segment.

Where data indicative of multiple scenicity parameters is obtained for a segment based on respective ones of multiple subsets of the positional data for an element represented by the segment, whatever criterion or criteria these are based on, an overall scenic parameter for the segment may be obtained based on the multiple scenicity parameters, and used in obtaining the scenic rating for the segment. The scenicity parameters may be combined in any suitable manner to obtain an overall scenic parameter for the segment. For example, scenicity parameters may be obtained in respect of different modes of transport, e.g. based on count ratios, and/or in respect of different time periods, and combined to provide an overall scenic parameter for a segment. The method may comprise combining the scenic parameters obtained in respect of different ones of the subsets of the identified positional data expected to relate to recreational travel using an appropriate function to provide an overall scenic parameter. Each scenic parameter may be indicative of a count ratio for the element represented by the segment as described above, based on a different one of the subsets of positional data.

The scenic rating for a segment may, in these embodiments, correspond to the overall scenicity parameter for the segment, or may be determined in some manner based on the overall scenicity parameter.

The scenic rating for a segment may be obtained based on data relating to that segment alone e.g. one or more scenic parameters e.g. count ratios as described in the embodiments above. However, it may be desirable to determine a scenic rating which provides an indication of the scenicity of a segment relative to other segments of the navigable network. The method may comprise using the one or more scenicity parameters for a segment, and the one or more scenicity parameters obtained in respect of at least some, or each of the other segments of the plurality of segments considered to determine a scenic rating for the segment indicative of a scenicity of the segment relative to the scenicity of other ones of the at least some of the segments of the navigable network. The scenicity of the segment is indicative of the scenicity of the element represented by the segment, and thus, in these embodiments, the scenic rating is indicative of the scenicity of the element represented by the segment relative to that of the elements represented by the other segments of the at least some of the segments. The scenic rating may based on a percentile value. For example, the scenic rating may be the percentile value indicative of the scencity of the segment relative to the other segments considered, or otherwise based thereon, e.g. according to a scale based on percentile values etc. Thus, obtaining the percentile value may be used as an intermediate step in determining the scenic rating. Where multiple scenicity parameters are determined in respect of segments, the overall scenicity parameters determined for the segment, and the other ones of the segments may be used in determined the relative scenicity rating.

It will be appreciated that the scenicity of a segment is indicative of the scenicity of the element represented by the segment.

In accordance with any of the aspects or embodiments of the invention, whether or not a relative scenic rating is determined for a segment, the scenic rating obtained may indicate a scenicity level for the segment based on a number of discrete levels of a scenicity scale. In other embodiments, the scenic rating may indicate a scencity level for a segment (whether or not in relative terms) as one of a continuum of values e.g. a percentage or percentile value. In simple embodiments, the scenic rating may simply indicate that the segment is associated with scenic properties (i.e. the element represented by the segment is considered scenic), without providing any indication of a level of the scenicity. Thus, the scenic rating may simply flag that the segment is considered scenic in a binary system, such that the presence or absence of scenic rating may be used to indicate that a segment is scenic or not, with no distinction between scencity levels.

The method comprises, for at least some of the plurality of segments representing navigable elements for which a scenic rating is determined, generating data indicative of the obtained scenic rating for the segment, and associating data indicative of the scenic rating with the segment to which it relates. Data indicative of an obtained scenic rating may be generated and associated with each segment, or only a subset of the segments. The data may be associated with segments in a conditional manner. In some embodiments, the data is only generated and associated with segments for which the scenic rating indicates a scenicity above a predefined threshold. The threshold may be in absolute or relative terms. In embodiments in which the scenic rating is based on a percentile value, the threshold may be a percentile value e.g. 80th percentile, such that only 20% of the segments have a scenicity rating associated therewith. In these embodiments, a scenic rating is only associated with a subset of the segments of the electronic map considered, which have a scenic rating indicating at least a minimum level of scenicity (whether relative to other segments or otherwise).

The method may further comprise using the scenic rating data associated with the at least some of the plurality of segments. The data may be used in various manners. The method extends to the step of performing one or more functions using the data.

The method may comprise storing the scenic rating data in association with electronic map data indicative of the segment to which it relates.

Alternatively or additionally, the method may comprise displaying a representation of the scenic rating associated with the segment on a representation of the electronic map. A representation may be a colouring, intensity of colour etc.

Alternatively or additionally the method may comprise transmitting data indicative of the scenic rating in association with data identifying the segment to which it relates (which may or may not be the segment data itself). For example, the data may be transmitted to a server or navigation device for use in route planning.

Alternatively or additionally the method may comprise using the scenic rating data associated with the at least some of the plurality of the segments in generating a route to a destination expected to have scenic properties. Such a step may be performed by a navigation device or by a server. For example, the method may comprise generating a route to a destination by exploring segments of the electronic map from a position on a segment representative of a starting location of interest e.g. a current position using a search algorithm having an associated cost function. The search algorithm may be arranged to determine a least cost route e.g. a route which maximises scenicity.

In some embodiments the scenic rating obtained in respect of a segment is a time dependent scenic rating. The method may comprise obtaining one or more further time dependent scenic rating for the segment in respect of a different time period. The method may incorporate any of the steps described in relation to determining the (first) scenic rating. In some embodiments, a set of scenic ratings in respect of the segment are determined, applicable to different time periods. The set may include two or more scenic ratings. The set of scenic ratings may provide a scenic rating profile e.g. a daily profile for the segment. This is particularly appropriate where the scenic rating is based on mode of transport rather than time of traversal of segments. A time dependent scenic rating may be obtained based on subset(s) of data filtered by reference to the time period of interest. Where the scenic rating is already based upon a subset of data which has been obtained based on a time of traversal based criteria, whether alone, or in combination with mode of transport, a set of scenic ratings may be obtained in respect of different time periods (whether relating to time periods in which traversals are expected to be for recreational reasons or otherwise). The set of scenic ratings may, in some cases, include one or more further scenic ratings in respect of time periods other than ones at which traversals are expected to occur for recreational purposes, to provide a set of scenic ratings providing a scenic rating profile. For example, ratings in respect of each hour of a day, or day vs night may be determined.

It may be desirable to perform some processing of the obtained positional data in order to obtain a scenicity parameter in accordance with the invention, e.g. to enable a count of traversals of the element to be obtained based on a subset of the data. This may be performed in relation to the identified positional data relating to the movement of devices along a navigable element represented by a segment being considered for the purposes of the present invention, and/or in relation to the subset(s) of data obtained based thereon, or, indeed at any stage or stages. For simplicity, the processing is preferably performed in relation to the identified set of the data.

In embodiments in which the positional data for each device is indicative of the position of the device at a plurality of different times, the method may comprise, for the or each segment being considered, ensuring that the identified positional data relating to the movement of devices along the navigable element represented by the segment includes, for each device, only one position data point (i.e. "probe") deemed to relate to a given traversal of the element by the device. Thus the identified data set which is used in the filtering step of the present invention based on one or both of mode of transport and time of traversal preferably includes, for each device, only one position data point e.g. probe in respect of each traversal of the element by the device. This may enable a count to be determined of the number of traversals by devices of according to a particular (sub)set of data by simply summing the number of probes/data points present in the (sub)set of data. This may be achieved by processing of the obtained positional data before, during or after identifying the positional data relating to the movement of devices along a navigable element represented by a segment under consideration. For example, the method may comprise adding a position data point (probe) in respect of a device to the identified positional data set only when no existing position data point (probe) is present in the data set which may be considered to relate to the same traversal of the navigable element by the device. Any suitable technique may be used to identify multiple position data points i.e. probes which may be considered to relate to the same traversal of a navigable element by a given device. For example, this may be performed by reference to a navigation application identifier associated with each position data point i.e. probe. For example, the method may involve excluding additional position data points (probes) deemed to relate to the same navigation device associated with times within a predefined time window based upon a first position data point (e.g. a data point already added to the set of identified data) deemed to relate to a given navigation device. This may be performed by excluding additional instances of position data points (probes) associated with a particular navigation application identifier associated with times within the time window. The time window may correspond to a time period of interest as above described.

The present invention uses positional data relating to the movement of devices in a geographic area covered by an electronic map with respect to time i.e. along navigable elements of the navigable network represented by the segments of the electronic map. The devices are devices associated with users.

The positional data may be historical positional data that is not necessarily received specifically for the purposes of the present invention. For example, the data may be data obtained from an existing database of such "probe" data, from which the relevant data may be filtered out. The step of obtaining the positional data may or may not comprise receiving the data from the devices. In some arrangements the step of obtaining the data may comprise accessing the data, i.e. retrieving data that had previously been received and stored. In arrangements in which the method involves receiving the data from the devices, it is envisaged that the method may further comprise storing the received positional data before proceeding to filtering the data and carrying out the other steps of the present invention. The step of obtaining the positional data need not take place at the same time or place as the other step or steps of the method.

In embodiments the positional data is in the form of a plurality of positional or probe traces, each representing the position of a device at different times.

The positional data used in accordance with the invention is collected from a plurality of devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along a navigable element represented by a segment in accordance with the present invention. However, in preferred embodiments all positional data is associated with temporal data, e.g. a timestamp. The temporal data may be indicative of a date and time to which the positional data relates. The positional data may comprise a set of coordinates e.g. latitude and longitude coordinates.

The positional data may be associated with other data, such as a mode of transport with which the device is associated. The positional data may be associated with data indicative of the mode of transport with which the device is associated and/or data which may be used to identify the device. The data identifying the device may directly or indirectly identify the device. For example, the data may identify an instance of a navigation application running on the device. This data may, for example, be used to ensure that only one position data point (probe) relating to a given traversal of a navigable element represented by a segment by a given device is taken in consideration in the filtering step of the present invention. In those embodiments which filter the data based upon mode of transport, the positional data will be associated with mode of transport data.

In embodiments the positional data relating to the movement of the plurality of devices with respect to time in the area comprises, for each device, data indicative of the position of the device at a plurality of different times, wherein the data indicative of the position of the device at a given time is associated with at least data indicative of the time (e.g. a date and time of day). The data indicative of the time may be in the form of a timestamp. The data indicative of the position of the device at a given time may also be associated with additional information, such as one or both of data indicative of the mode of transport with which the device is associated and data identifying the device.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, wearable devices with positioning capability, position sensors, etc.

The device may be associated with a vehicle or a pedestrian. A vehicle may include, for example, a truck, car, motorcycle, bicycle etc.). It will be appreciated that the vehicles may be powered in any suitable manner, and include electric vehicles and user powered vehicles i.e. pedal cycles. Thus the position of the device will correspond to the position of the vehicle or pedestrian. References to positional data obtained from devices associated with vehicles or pedestrians, may be replaced by a reference to positional data obtained from a vehicle or pedestrian, and references to the movement of a device or devices may be replaced by a reference to the movement of a vehicle or pedestrian, and vice versa, if not explicitly mentioned. A device associated with a vehicle may be integrated with the vehicle, or may be a separate device associated with the vehicle such as a mobile device, portable navigation apparatus, or a device worn by an occupant of the vehicle etc. A device associated with a pedestrian may be any mobile device, whether or not a telecommunications device, and may be a wearable device. In some embodiments, the obtained positional data relates to the movement of devices associated with vehicles with respect to time (i.e. and not pedestrians).

The device may be any device having position determining capability, and which is arranged to transmit data indicative of a current position of the device at different times e.g. at predetermined interval. The device may be arranged to transmit the data to a server, which may or may not be a server which performs other steps of the methods described herein. The device may be a device upon which a navigation application is running to cause the device to transmit positional data at different times.

The positional data obtained from the plurality of devices is commonly known as "probe data". Data obtained from devices associated with vehicles or pedestrians may be referred to as vehicle or pedestrian probe data. References to "probe data" herein should therefore be understood as being interchangeable with the term "positional data", and the positional data may be referred to as probe data for brevity herein. Of course, the positional data may be obtained from a combination of different devices, or a single type of device. However, the present invention is not limited to the use of positional data obtained from a particular type of device, or devices associated with a particular mode of transport, e.g. vehicles or pedestrians, and probe data from devices associated with multiple forms of transport may, and typically are, equally be taken into account.

The obtained positional data used herein in any of the embodiments described may comprise location data and associated temporal data (e.g. a time stamp), and is optionally associated with data identifying a navigation application associated with a device from which the data is obtained, and/or data identifying a mode of transport with which the device from which the data is obtained is associated. For example, each obtained positional data sample may comprise; a location (e.g. latitude and longitude coordinates), temporal data e.g. a time and a date, and optionally a navigation application identifier and/or a mode of transport identifier. The mode of transport identifier identifies the mode of transport with which the instance of the navigation application is associated i.e. the mode of transport associated with the device running the application. Where filtering is based on mode of transport, mode of transport data is required.

In accordance with a further aspect of the invention, a system, optionally a server, is provided for performing the method of any of the embodiments described herein.

In accordance with a further aspect, the present invention provides a system for generating a scenic rating for segments of an electronic map, the segments representing navigable elements of a network of navigable elements within a geographic area covered by the electronic map, the system comprising:
  means for obtaining positional data relating to the movement of a plurality of devices with respect to time in the area;
  and, for each one of a plurality of segments of the electronic map;
  means for identifying a set of positional data relating to the movement of devices along the navigable element represented by the segment,
  means for filtering the identified set of positional data relating to the movement of devices along the navigable element represented by the segment based on one or more criteria to obtain one or more subset of the identified positional data relating to the movement of devices along the element represented by the segment which may be expected to relate to traversals of the navigable element for recreational purposes, wherein the criteria include mode of transport with which the devices are associated and/or a time of traversal of the element represented by the segment,
  means for using the or each obtained subset of the positional data to obtain one or more scenicity parameter which may be used in determining a scenic rating for the segment,
  and means for using the one or more obtained scenicity parameter to determine a scenic rating for the segment;
  the system further comprising, for at least some of the plurality of segments representing navigable elements for which a scenic rating is determined, means for generating data indicative of the obtained scenic rating for the segment, and means for associating data indicative of the scenic rating with the segment to which it relates.

The present invention in these further aspects may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits) and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

The system may further comprise data storage means, such as computer memory, for storing, for example, data indicative of scenicity parameters or scenic ratings for segments, and/or the positional data or subset(s) thereof. The methods of the presented invention are computer implemented methods. The methods of the present invention are, in preferred embodiments, implemented by a server. Thus, in embodiments, the system of the present invention comprises a server comprising the means for carrying out the various steps described, and the method steps described herein are carried out by a server.

It will be appreciated that the network of navigable elements, and any navigable element, as referred to herein, are navigable elements of a real world or physical navigable network. The network is represented electronically by electronic map data. The electronic map data may be stored by or otherwise accessible by the server, in embodiments in which the method is implemented using a server. In the electronic map data, the navigable network is represented by a plurality of segments connected by nodes. Each segment of the electronic map represents at least a portion of navigable element of the navigable network.

The present invention may be implemented in relation to navigable elements of any type. Preferably the navigable elements are road elements (of a road network). While exemplary embodiments refer to road elements of a road network, it will be appreciated that the invention is applicable to any form of navigable element, including elements of a path, river, canal, cycle path, tow path, railway line, or the like. For ease of reference these are commonly referred to as a road element of a road network.

The methods in accordance with the invention in any of its aspects described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CDROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

The present invention in accordance with any of its further aspects or embodiments may include any of the features described in reference to other aspects or embodiments of the invention to the extent it is not mutually inconsistent therewith.

Any reference to comparing one item to another may involve comparing either item with the other item, and in any manner.

It should be noted that the phrase "associated therewith" in relation to one or more segments or elements should not be interpreted to require any particular restriction on data storage locations. The phrase only requires that the features are identifiably related to an element. Therefore association may for example be achieved by means of a reference to a side file, potentially located in a remote server.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the system or apparatus, it will be appreciated that any one or more or all of these operations may be performed in the method and by the system or apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which:

FIG. 11 is a flow chart illustrating the way in which a scenic rating may be obtained for a segment based on filtering probe data by reference to time of traversal of the segment.

DETAILED DESCRIPTION OF THE FIGURES

A system which may be used to implement the present invention will now be described by reference to FIGS. 1-12. Embodiments will now be described with particular reference to a Portable Navigation Device (PND). It should be remembered, however, that the teachings of the present invention are not limited to PNDs but are instead universally applicable to positional data obtained from any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that where route planning is performed, e.g. using scenic rating data in some embodiments of the invention, this may occur even in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
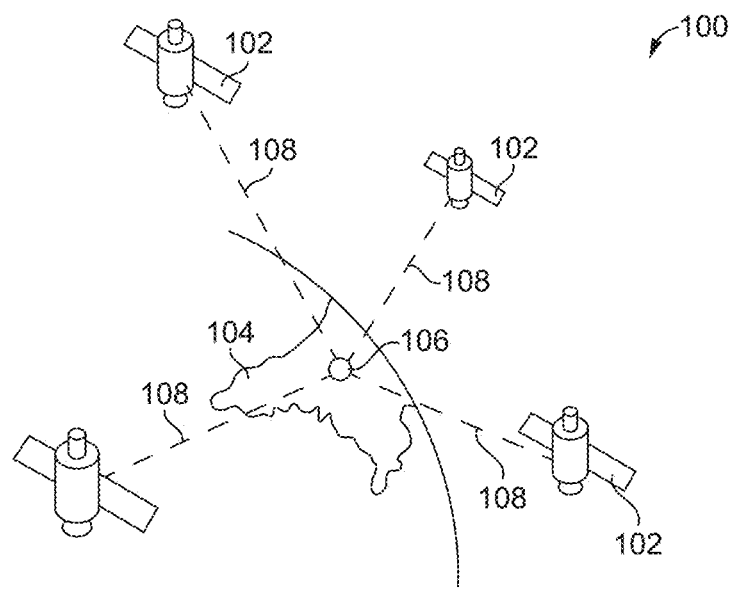
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
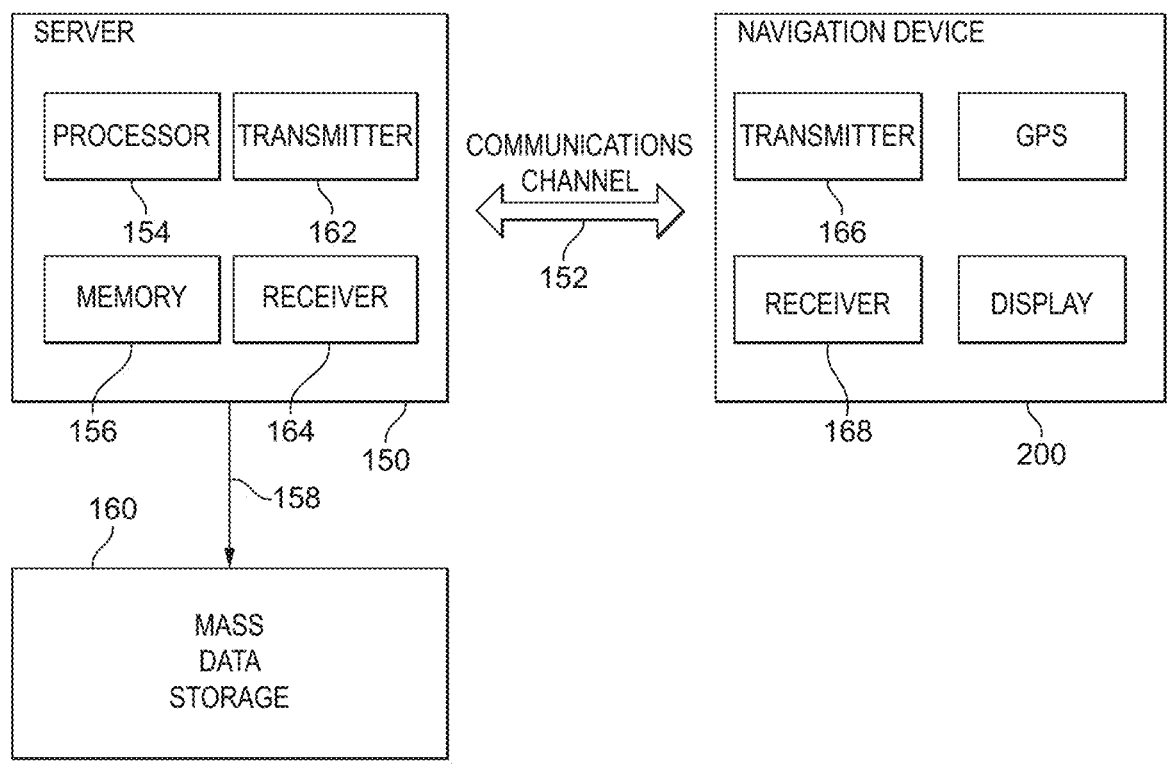
FIG. 2 is a schematic diagram of a communications system for communication between a navigation device and a server.

Turning to FIG. 2, a navigation device 200 (e.g. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
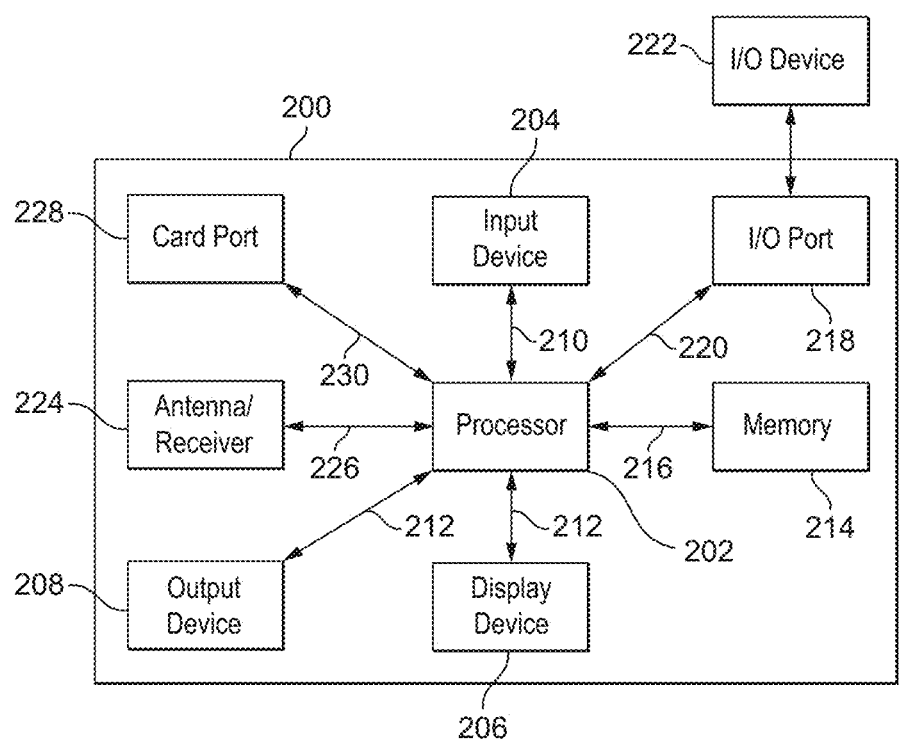
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
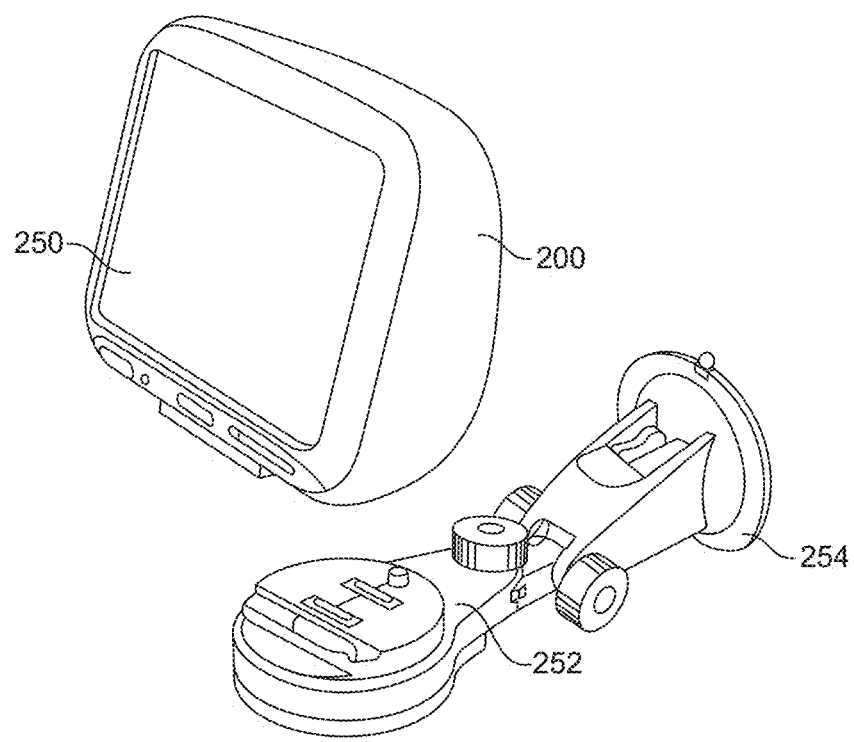
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard, window or the like using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 5:
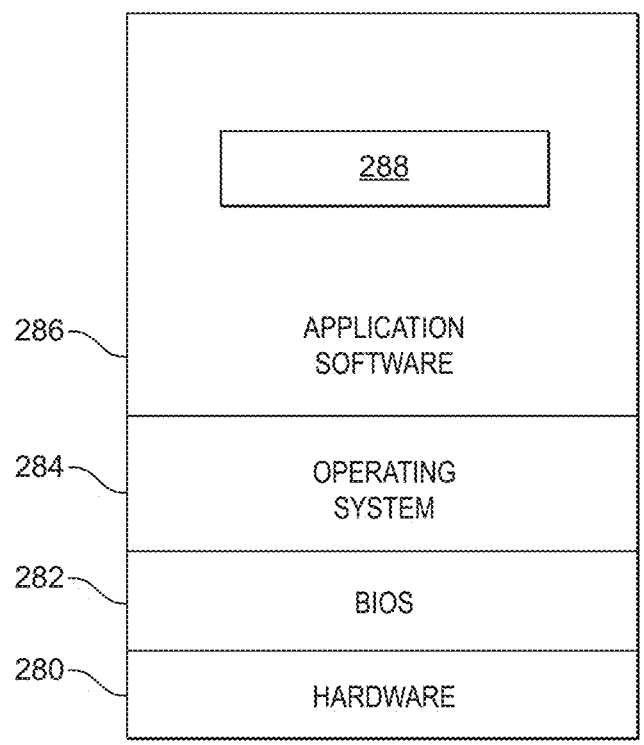
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the described route planning and navigation functionality) can run. The application software 286 provides an operational environment including the Graphical User Interface (GUI) that supports core functions of the navigation device, for example map viewing, route planning, navigation functions and any other functions associated therewith. In this respect, part of the application software 286 comprises a view generation module 288.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit.

Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time.

In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214/card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to deleted the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data. This data may provide positional data upon which the methods of the present invention may be performed.

As discussed above, the mass data storage 160 also contains map data. Such map data provides information about the location of road segments, points of interest and other such information that is generally found on map. Scenic rating data obtained in accordance with the invention may be stored in association with such map data.

Some embodiments of the invention will now be described.

It will be appreciated that a server operating in a system of the type described above will receive location data from various different types of device running respective navigation applications, and which are arranged to transmit data indicative of their whereabouts to the server. Such devices may or may not be dedicated navigation devices, and may or may not be integrated with vehicles. For example, various types of mobile device may run navigation applications, including mobile phones, tablet devices, wearable devices e.g. sports watches, as well as specific navigation devices.

The methods of the present invention are described in relation to using data received from devices running a navigation application. Any such device may be referred to as a navigation device. Such a navigation device may be provided by any mobile device. A non-integrated navigation device, whether provided by a dedicated navigation device, or any other type of device running a navigation application, may be referred to as a PND. Alternatively, other forms of navigation device may be used, e.g. an integrated in-vehicle device.

The embodiments of the invention are carried out in relation to electronic map data comprising a plurality of segments indicative of elements of a navigable network e.g. a road network. The segments are connected by nodes.

Navigation applications are useful in determining a route to a destination. For example, the navigation application may display a current location of a device running the application on a map. The navigation application operates on electronic map data and on device location data, such as may be obtained from any applicable positioning system of the device e.g. a GPS or GNSS positioning system. A navigation application may determine a route to a destination from the current location, or other location of interest.

A destination may be automatically determined, or input by a user. Typically, calculating a route to a destination involves exploring segments of the electronic map to based on a cost associated with traversing the segments. For example, a least cost route may be generated, with respect to an applicable cost function. This may be performed in order to generate a least cost route with respect to time, distance or fuel consumption. One example of a way in which such a least cost route may be determined is using Dijkstra's algorithm to calculate a shortest path between two nodes in a weighted graph. There are many variants on this algorithm which may be used, and various aspects that influence travel time may be taken into account e.g. traffic conditions.

Traditional path generation methods enable users to travel to a destination in the shortest possible time. Path generation methods exist that consider any constraints on road segments. For example, some road segments may be closed to slow vehicles or to heavy vehicles. It also is common for path generation methods to consider traffic conditions (congestion delays, delays due to accidents or road works) and temporary road closures. Known navigation systems also may monitor changes to update estimated arrival times or to provide a faster path to the destination. Some navigation applications may enable a user to set a preference for a functional road class or a road hierarchy level.

The Applicant has realised that rather than merely determining an efficient route from a starting point to a destination, a user may wish to generate a route which they can expect to enjoy traversing. Conventional route determination methods, e.g. based upon functional road class (FRC), shortest path selection, traffic conditions etc. do not provide a way of generating such enjoyable routes. However, there are numerous factors which may influence the extent to which a road segment may be enjoyable to traverse e.g. road surface, road dimensions, road straightness, elevation, slope, surroundings. Some of these factors are subjective in nature. The extent to which a road segment is enjoyable to traverse may depend upon the mode of transport used to traverse the segment e.g. a segment may be enjoyable for a cyclist, but less so for a car driver. Furthermore, the extent to which a road segment is enjoyable to traverse may vary e.g. at different times of the day/week, or in different weather conditions.

The present invention provides methods which enable a scenic rating to be determined in respect of segments of an electronic map, indicative of the scenicity of that segment i.e. the scenicity of the element represented by the segment. A segment as used herein refers to the representation of a real world navigable element e.g. road element in electronic map data. A segment may be considered to have a scenicity property representative of a scenicity of the element it represents. The scenicity of a segment may be considered to be an attribute of the segment, in the same manner as curvature etc. References to a scenicity parameter or scenic rating or scenicity of a segment or element represented by the segment herein may be considered to be interchangeable, unless the context demands otherwise. References to a device traversing a segment should be understood to refer to traversing the element represented by the segment if not explicitly stated.

A first embodiment of the invention will be described by reference to FIG. 6. The invention will be described in relation to the case in which the method is performed by a server.

As described above, a navigation application may be arranged to transmit time stamped data at regular intervals to a server, indicative of at least the location of the device running the navigation application. Each such location data sample may be referred to as a "location probe", or, more simply a "probe". A location probe may include latitude and longitude coordinates, a time, and other parameters such as date and mode of transport. Location probes are transmitted by a large range of devices and contain varying amounts of parameters depending on the usage of the location and navigation services. For commercial vehicles, it may be relevant to include hours worked, resting times, fuel usage and travel speed. Some vehicles may always transmit location probes, some may only transmit them during navigation, and other only transmit such data after an incident or a theft detection trigger. Collectively, the location data samples i.e. probes received by the server from devices running navigation applications may be referred to as "probe data".

The present invention uses probe data obtained from devices traversing elements represented by segments of a region of a navigable network covered by an electronic map to determine a scenic rating for at least some of the segments of the electronic map, indicative of a scenicity of the element represented by the segment. The devices are devices running navigation applications.

For use in the purpose of the invention, a location probe i.e. a location data sample includes at least time stamped location data, a navigation application identifier, and a mode of transport identifier. For example, a location probe sample $p_n$ may include; a location (latitude and longitude coordinates), a time, a date, a navigation application identifier and a mode of transport identifier. These fields may be described using the record notation: $p_n$.location, $p_n$.time, $p_n$.date, $p_n$.nav-id and $p_n$.mode-tr. The mode of transport identifier identifies the mode of transport with which the instance of the navigation application is associated i.e. the mode of transport associated with the device running the application. Navigation applications are used in association with various modes of transport (e.g. cars, trucks, electric vehicles, motorcycles, bicycles, pedestrians, etc.). The navigation application identifier identifies the particular instance of the navigation application. Each device will be associated with a particular instance of a navigation application.

Figure 6:
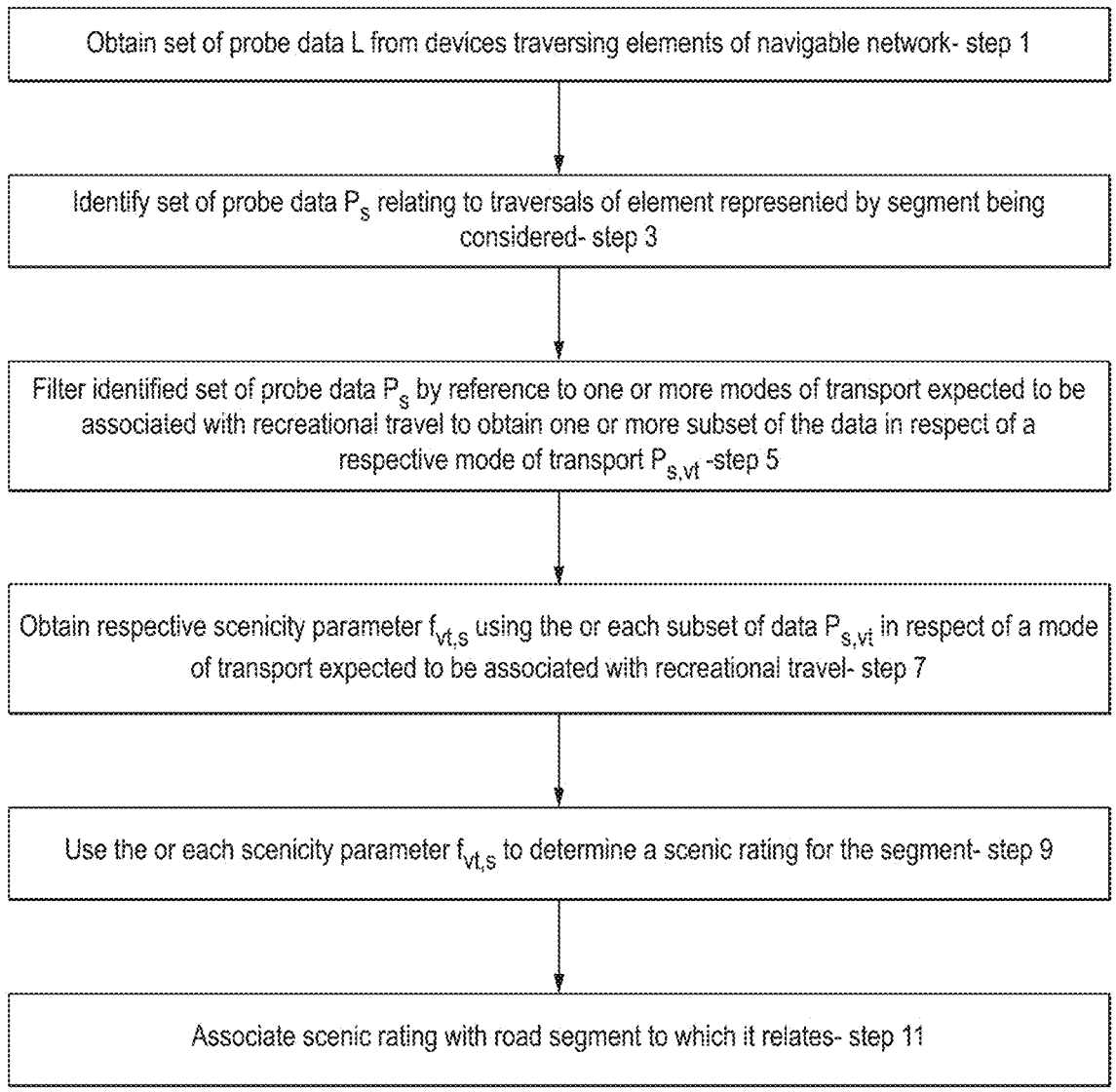
FIG. 6 is a flow chart illustrating the way in which a scenic rating may be obtained for a segment based on filtering probe data by reference to mode of transport.

Referring to FIG. 6, each device running an instance of a navigation application provides such location probe data at intervals to a server e.g. of a map services provider. Step 1 of the method involves the server obtaining location probe data from devices traversing elements of the navigable network. The server stores the location probe data obtained from devices running navigation applications in the area in an appropriate data storage facility, e.g. in a mass data storage as described by reference to FIG. 2. This produces a set L containing all received location probes $p_n$. The number of elements in the set L is indicated by |L|. For purposes of the invention, historic probe data obtained over a period of months or even years may advantageously be used.

The present invention performs certain steps in relation to each one of a plurality of segments of an electronic map. The electronic map includes segments representing road elements of a network of road elements within a geographic area covered by the electronic map. For example, the road network may be represented by nodes (junctions) n connected to road segments (links) s. The method may be implemented in relation to each segment, or a subset of the segments of the electronic map e.g. in a map area of interest.

In step 3, a set of probe data $P_s$ relating to traversals of a road element represented by the segment being considered is identified. This may be performed using any suitable map matching technique.

Steps are taken to try to ensure that only one location probe for each traversal of the road element by a given device is included. Additional location probes relating to the same device which may be considered to relate to the same traversal of the element are excluded e.g. probes from within a given time window of a first probe for the device which may be expected to relate to the same traversal of the element. This may be done by consideration of the navigation application identifier which forms part of the probe data, which identifies a particular instance of a navigation application, and hence device. One way in which this may be done will now be described, by way of example only.

A road segment corresponds to a map area s.area. When a device running a navigation application traverses an element represented by a road segment s, it may provide several location probes $p_j$ related to that road segment to the navigation server which adds them to the set L. These additional probes $p_j$ have a location $p_n$.location that falls within the area s.area of the road segments (or very close to that area) and they fall within a time and date range suitable for traversing the road segment. Based on this observation, it is possible to determine a set of probes $P_s=\{p_i\}$ from the set of all probes L that are within the area of the road segment s and in which each probe $p_i$ is associated with a single navigation application traveling along the element represented by the road segment (removing probes within a small time window $t_w$ for the same navigation application and the same road segment).

The present invention involves obtaining a scenic rating for a segment representing a road element, and indicative of a scenicity of the road element, through a method which involves filtering the identified set of location probe data based on one or both of the mode of transport and time/date fields. The way in which filtering of an identified set of location probe data based on mode of transport and time may be used to explore variation in probe data patterns will now be illustrated by reference to FIGS. 7A, 7B, 8A and 8B.

Figure 7A:
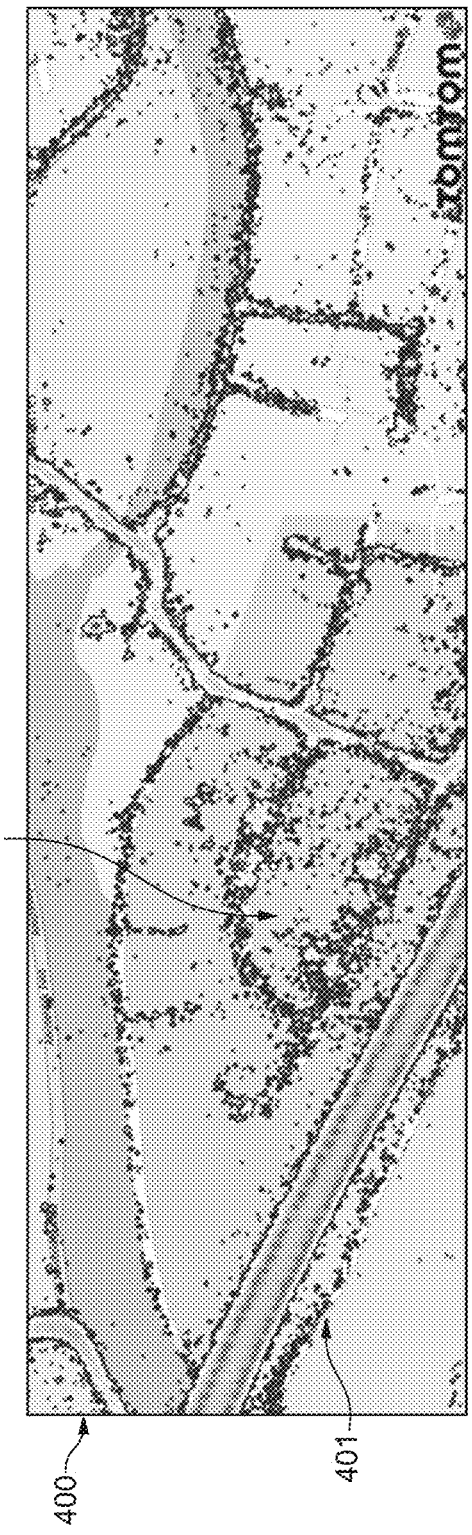
FIG. 7A illustrates probe data obtained from commercial vehicles in a given map area.

FIG. 7A provides an example of historic location probe information obtained for road elements of a portion of a road network, and represented on a displayed electronic map area 400. The map area 400 includes an industrial area 410. This is an example of the type of data which may be obtained by performing the steps described above to identify a set of (historical) probe data relating to each one of a plurality of elements represented by segments of the electronic map in the map area 400, and then filtering the data to obtain a subset of data which relates only to selected mode(s) of transport. Each probe 101 is indicated by a dot on the segment representing the element to which it relates, and is indicative of one traversal by a device. Where multiple location probes, from multiple devices, are associated with the same location, this is indicated using shading, indicative of an intensity level. FIG. 7A illustrates probe data in respect of only those probes 401 associated with commercial vehicles, such as vans or trucks.

Figure 7B:
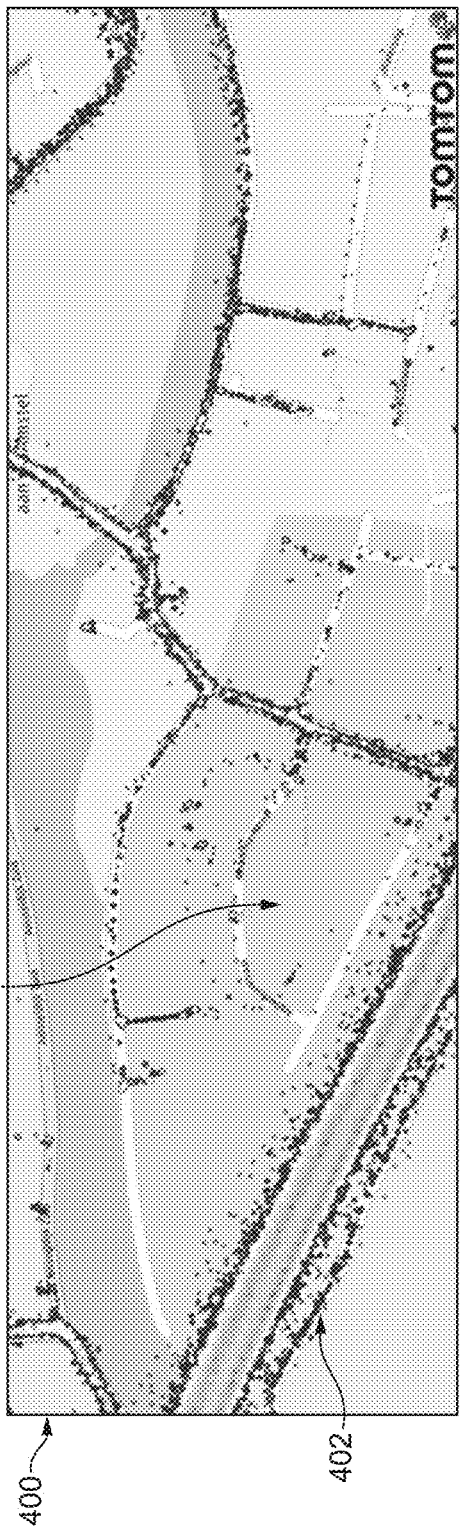
FIG. 7B illustrates probe data obtained from non-commercial vehicles in the same map area.

FIG. 7B is a corresponding view to FIG. 7A, but with the probe data filtered such that only probe data 402 for non-commercial vehicles is shown. A comparison of FIGS. 7A and 7B show that there are different probe data patterns associated with commercial and non-commercial vehicles. One of the differences is the number of location probes in an industrial area 410. There are a lot of location probes 401 from commercial vehicles as shown in FIG. 7A, and a very small number of location probes 402 from non-commercial vehicles, as shown in FIG. 7B, in that area.

FIGS. 7A and 7B thus demonstrates that an analysis of collected location probes filtered on mode of transport provides insight into the use of the road network.

Figure 8A:
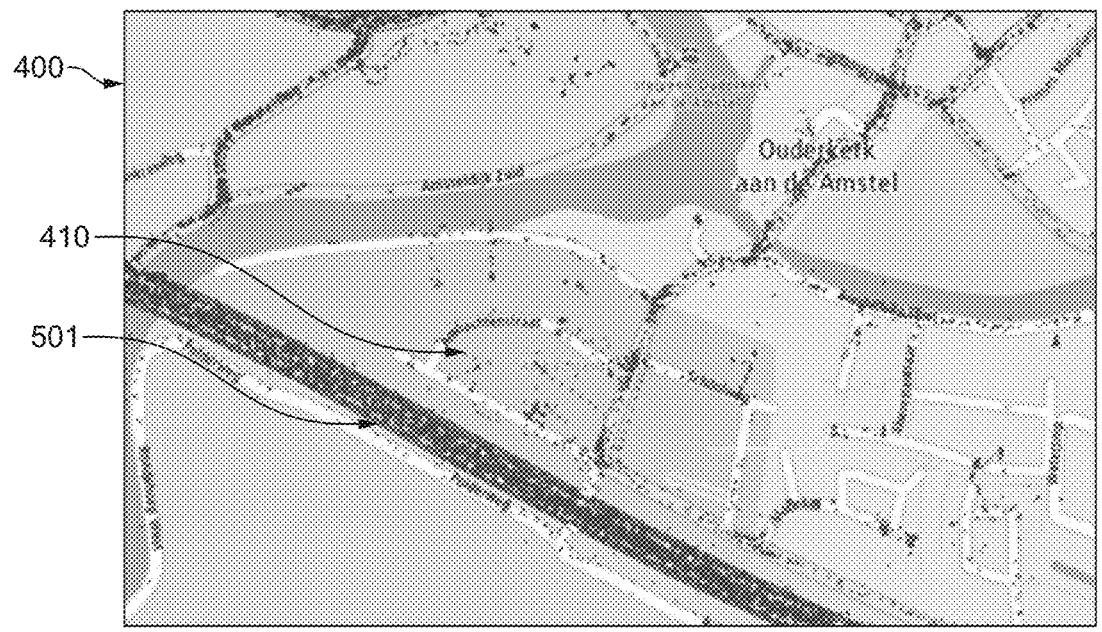
FIG. 8A illustrates probe data obtained from commercial vehicles on a weekend day in a given map area.
Figure 8B:
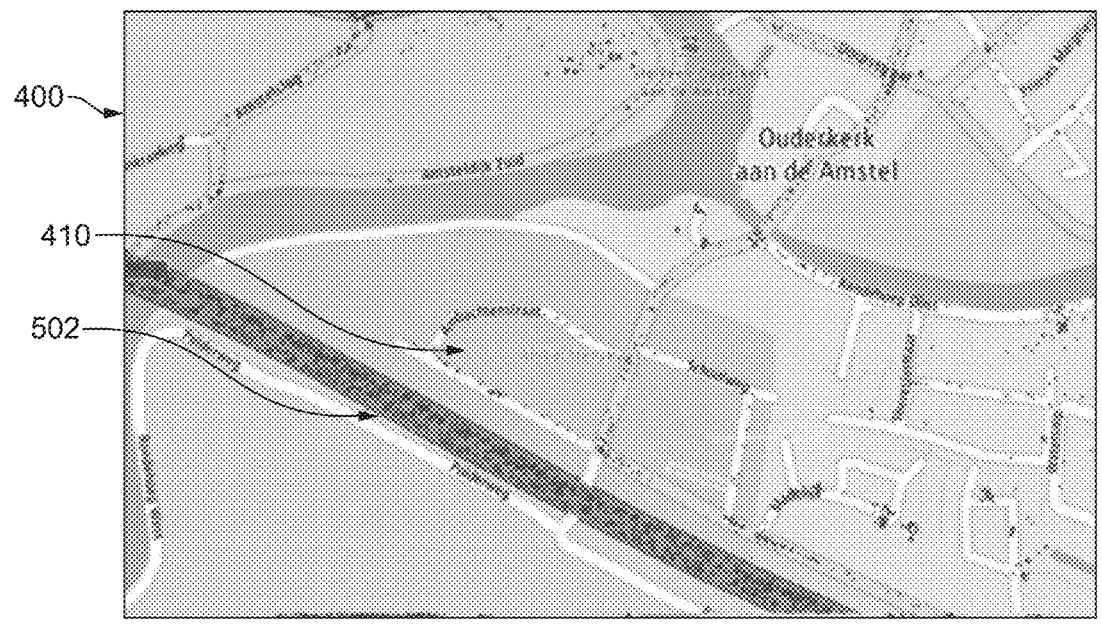
FIG. 8B illustrates probe data obtained from commercial vehicles in the same map area on a weekday.

FIGS. 8A and 8B similarly illustrate the difference in probe data patterns in the map area 400, but this time for different times. FIG. 8A shows the probe data pattern based on location probes 501 for commercial vehicles, such as vans and trucks, for a weekend day, while FIG. 8B shows the corresponding probe data pattern based on location probes 502 for a working weekday. The location probes in FIGS. 8A and 8B are obtained by identifying a set of (historical) probe data relating to each one of a plurality of elements represented by segments of the electronic map in the map area 400, and then filtering the set of data to select only those location probes associated with modes of transport corresponding to commercial vehicles, and also corresponding to traversals of the elements associated with a date/time falling within a weekend or weekday respectively. It will be appreciated that a date value associated with a location probe may be used to determine the day of the week.

A comparison of location probe patterns in FIGS. 8A and 8B illustrates that commercial vehicles use the road network substantially during workdays and that such vehicles generally are absent in the weekend. Further filtering of the location probes in either of the examples of FIGS. 7A and B or 8A and B may be performed, e.g. to specific workdays, in order to explore further differences in probe data patterns.

These examples show that both mode of transport (mode-tr) and time (date, time) probe data fields can be used to infer attributes of the road network.

The Applicant has recognised that collected historical location probe data sets may also provide insights to enable inferences to be made as to the scenicity of a road element represented by a segment, and hence whether a road segment may be expected to be enjoyable to travel on.

Returning to FIG. 6, an embodiment of a method for determining a scenic rating for a segment in accordance with the invention using mode of transport information associated with the collected location probe data will now be described.

As mentioned above, in step 3, for each one of a plurality of elements represented by segments being considered, a set of probe data relating to traversals of the element is identified. As described above, it is possible to process the set of collected location probes L obtained in step 1 using a segment s and a time window $t_w$ to identify a subset of probes $P_s$ associated with a road segment s i.e. which can be assumed to relate to traversals of the element represented by the segment. The process involves determining for each probe $p_n$ in L whether the location falls within the area s.area of s. To ensure that only one probe per device running a navigation application is included in the subset of probes per traversal of the segment, these probes are only added to the set $P_s$ if there are no location probes $p_i$ in that set with the same navigation application identifier ($p_i$.nav-id), and within the time window determined by $p_i$.time, $p_i$.date and $t_w$. Using this construction, the set $P_s$ contains one location probe $p_i$ for each traversal of the road element represented by the segment by a navigation application. The road segment s has a total number of location probes $p_i$ given by $|P_s|$.

A road element represented by a segment s usually is accessible to devices associated with a range of mode of transports (e.g. trucks, cars, motorcycle, pedestrian, bicycle, etc.). The mode of transport associated with each probe is recorded as $p_i$.mode-tr. Some of modes of transport may be more likely to be associated with recreational travel. Thus, relatively high levels of use of an element represented by a segment by such modes transport may provide a good correlation with road segments that provide enjoyable travel. Examples are motorcycles, (electric) bicycles, pedestrians, e.g. where the data is obtained from a sport tracking device. In accordance with an embodiment of the invention, one or more such mode of transport is used to determine a scenicity parameter in respect of the segment, which may then be used to determine a scenic rating for the segment.

In step 5, the identified set of probe data $P_s$ relating to traversals of the element being considered is filtered using the mode of transport field vt to determine a subset $P_{s,vt}=\{p_i: p_i.\text{mode-tr}=vt\}$ of $P_s$ containing all location probes from the set $P_s$ for a particular mode of transport expected to be associated with recreational travel. It is possible to obtain such a subset $P_{s,vt}$ for each mode of transport in the set of location probes $P_s$ of a road segment expected to be associated with recreational travel. Of course, similar subsets may, if desired, be obtained in respect of all modes of transport, including those not expected to be associated with recreational travel.

The or each subset obtained in respect of a selected mode of transport $P_{s,vt}$ expected to be associated with recreational travel is used to obtain a respective scenicity parameter which may be used in determining a scenic rating for road element represented by the segment-step 7. This scenicity parameter $f_{vt,s}$ is indicative of a mode of transport use fraction (ratio), provided by dividing the number of probes $|P_{s,vt}|$ in the respective subset by a reference number of probes based on a reference set of data, corresponding to the total number of probes $|P_s|$ for the road segment (i.e. for all modes of transport). The respective number of probes in the respective subset and the reference set of probes correspond to respective counts of traversals of the segment. The scenicity parameter may correspond to the mode of transport use fraction, or may be a percentage derived therefrom if desired. In this embodiment, the same reference number of probes i.e. the data set $P_s$ is used for each subset of data considered. Of course, a corresponding scenicity parameter may also be determined in respect of other modes of transport, not expected to be associated with recreational travel, but will typically not be used in determining a scenic rating for the segment. Furthermore, a reference set of data need not necessarily correspond to the set of data relating to all modes of transport e.g. it is envisaged that a reference set might be based on non-recreational modes of transport.

In step 9, the or each scenicity parameter $f_{vt,s}$ obtained for the segment is used to determine a scenic rating $r_s$ for the road segment s. A scenic rating may be based upon only a single scenicity parameter, e.g. where only one such parameter is obtained, or at least used in determining the scenic rating. In this case $r_s=|P_{s,vt}|/|P_s|$ for a suitable mode of transport vt on road segments. Thus, the scenic rating simply corresponds to the scenicity parameter.

In other embodiments, scenicity parameters $f_{vt,s}=|P_{s,vt}|/|P_s|$ e.g. mode of transport use fractions (ratios) obtained in respect of each one of a plurality of modes of transport vt associated with recreational travel may be combined to obtain an overall scenicity parameter, which provides a scenic rating $r_s$ for a road segment s. For example, the combining operation can involve applying a function F( ) using the fractions $f_{vt,s}$ for a range of n modes of transport; $rs=F(f_{vt1,s}, \ldots, f_{vtn,s})$. The range of mode of transports includes modes of transport that are generally used for recreational travel purposes. Examples are motorcycles, (electric) bicycles, and pedestrians, (in which case, data may be obtained from sports tracking devices). Pedestrians herein include any person travelling by foot, whether running, walking or taking part in sport etc. The remaining modes of transports generally are used for more purposeful travel such as commuting, delivering goods etc.

Rather than simply corresponding to the scenicity parameter, or overall scenicity parameter for a segment, a scenic rating for a segment may be derived in any suitable manner based on such a parameter or overall parameter.

In step 11, the scenic rating $r_s$ is then associated with the road segment s. The server stores the scenic rating, and data indicative of the road segment with which it is associated.

The scenic rating is typically stored in association with the electronic map data for a segment. However, instead, the scenic rating, and an indication of the segment to which it relates, may be transmitted by the server as a separate message, similar to traffic information. This scenic rating may then be associated with the applicable segment according to an electronic map stored by a receiving device e.g. navigation device. A device running a navigation application e.g. mobile device or a PND may request or receive the scenic ratings for a specific map area of interest.

Rather than simply determining and associating the road segment s with a scenic rating corresponding to an individual or overall scenicity parameter obtained based on mode(s) of transport associated with recreational travel, a scenic rating in the form of a 'percentile' value may be obtained. This involves considering the set $V_{vt}$ of scenicity parameters e.g. mode of transport use fractions (ratios) $f_{vt,s}$ for all road segments s being considered e.g. all road segments in the road network. The elements of the set $V_{vt}$ have a distribution with an average, a standard deviation, a minimum value and a maximum value. The 1 percent of scenicity parameters e.g. ratios/fractions $f_{vt,s}$ in the set $V_{vt}$ have a percentile value of 1. The road segments s in this one percent of the fractions are then assigned a scenic rating of 1. This sequence can be repeated for each additional percentile value up to a maximum scenic rating of 100. In some embodiments, rather than being a percentile value, a scenic rating may be determined which indicates a level from a scale of a limited number of scenic rating level values. For example, the percentile value for a segment based on the one or more scenicity parameters for the segment may be used to assign the segment a scenicity rating from one of a limited range of rating values of a scale e.g. from 1 to 5 stars.

Instead of associating all road segments with a scenic rating, a scenic rating may only be conditionally associated with segments. In such a case, the determined scenic rating for a segment is assessed, and only when the scenic rating exceeds a threshold value is it associated with the road segment. For example, a scenic rating threshold may be set at the 80th percentile, so only 20 percent of the road segments contain a scenic marking. This reduces the amount of map information required, as most of the road segments fit a normal use profile. In such cases, the scenic rating meta data need not be stored, associated or provided for such road segments. Of course, in other arrangements, the scenic rating data for segments under the threshold may still be stored/associated with the segment, but need not necessarily be displayed, or used in subsequent operations.

Figure 9:
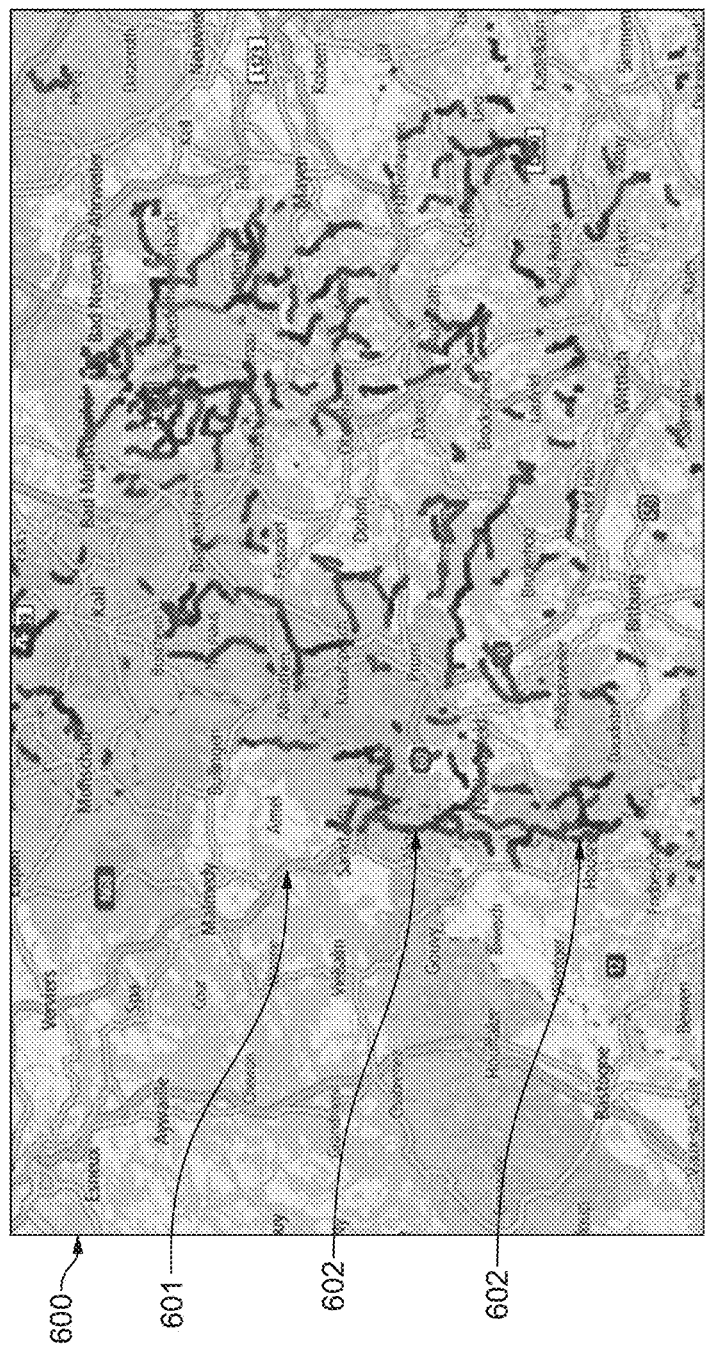
FIG. 9 illustrates one way in which scenic rating data for segments may be illustrated on a displayed electronic map.

FIG. 9 illustrates the way in which the scenic ratings $r_s$ associated with segments s of an electronic map may be displayed. The figure shows a map area 600 with a road network 601. Those road segments having a scenic rating above a certain threshold are marked by shading e.g. 602. In this example, the scenic rating is derived predominantly from a scenicity parameter based on motorcycle mode of transport e.g. a motorcycle use fraction. The intensity level of the shading of the road segments 602 indicates a level of the scenic rating i.e. higher intensities are associated with higher scenic rating. The road segments 301 with a scenic rating under a threshold value are not marked. From the example map area it is noticeable that the road segments with a relatively high scenic rating are not generally part of a highway or of a major road.

Figure 10:
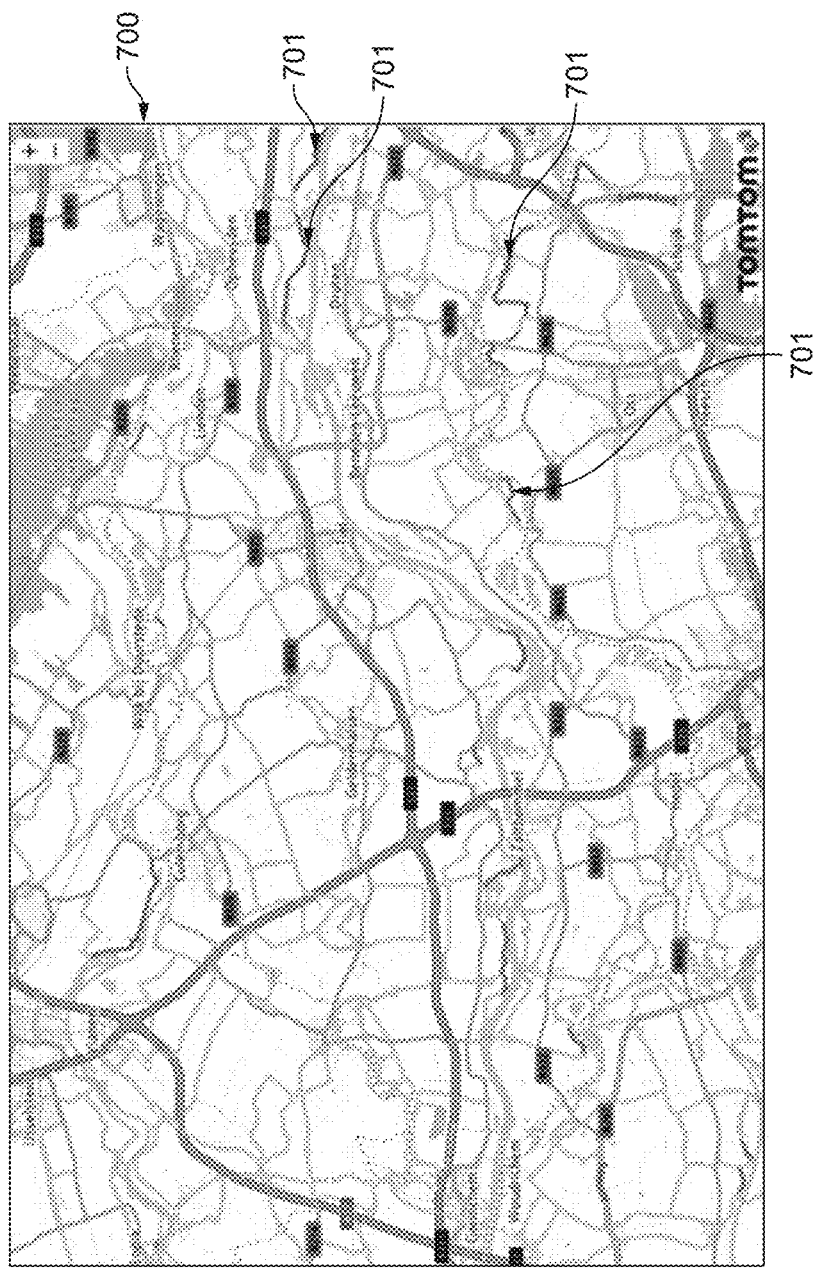
FIG. 10 illustrates how a binary scenic rating for segments may be represented on a displayed electronic map.
Figure 9:
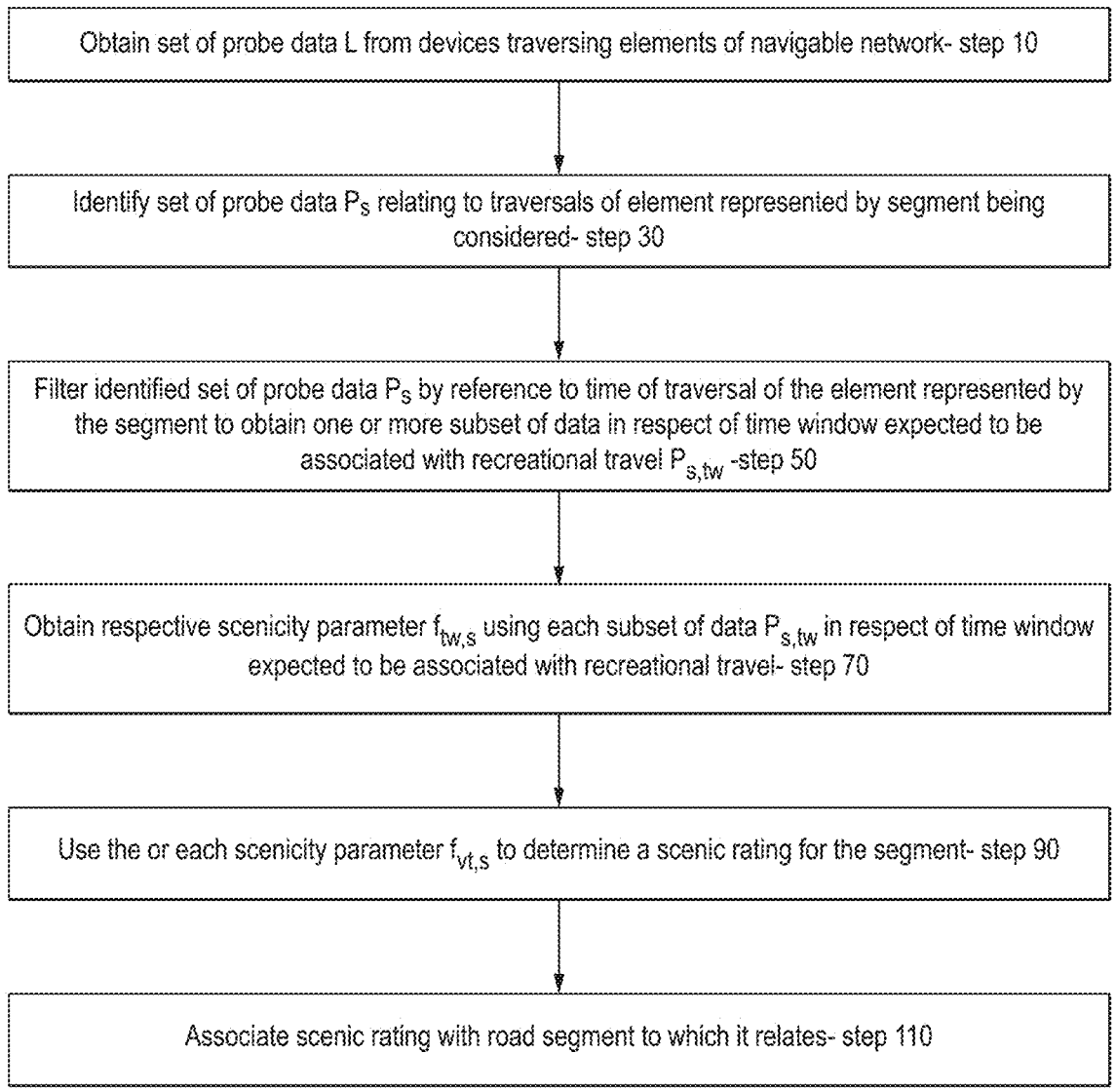

FIG. 10 below shows an area 700 of an electronic map with a binary scenic rating for road segments 701 (shown darker) where the scenic rating is above a certain threshold value. Thus, segments are shown simply as being scenic or not. The figure shows a map area 700 with a road network with road segments. The scenic road segments 701 are marked using a binary scenic rating. The scenic rating in the figure is obtained from the motorcycle use percentile with an 80th percentile threshold. This figure indicates that scenic road segments with characteristics that users enjoy traveling on, e.g. winding roads with views and roads along waterways.

In a further variant, a scenic rating for a segment may be time dependent. A set of scenic ratings may then be determined in respect of different times e.g. per time of the day and day of the week. A time dependent scenic rating may be obtained by basing the scenicity parameter(s) in respect of different modes of transport associated with recreational travel upon subsets of the identified set of probe data in respect of particular time periods e.g. periods associated with commuter traffic or not, daytime or night time etc. This may be achieved in a similar manner to that described below in which scenic ratings are determined by consideration of traversal times of segments expected to correspond to recreational travel. The time periods may be recurrent. Each scenic rating may then be associated with data indicative of the time period(s) to which it applies. This enables a route/road to be marked scenic at weekends only when there is no commuter traffic, or only scenic during daylight (as some views may be dependent on daylight) etc.

In accordance with further embodiments of the invention, a scenic rating may be determined for a segment by filtering the identified set of probe data $P_s$ by reference to time of traversal of the segment, rather than, or in addition to filtering by reference to mode of transport. For ease of reference, an embodiment filtering by reference to time of traversal of the segment, and not mode of transport, will be described by reference to FIG. 11. Steps 10 and 30 of the method correspond to steps 1 and 3 of FIG. 6.

In step 50, the identified set of probes $P_s$ associated with a road segment s is filtered to determine a subset $P_s,t_w$ containing probes $p_i$ for which the time of travel (using $p_i$.date and $p_i$.time) falls within a time period corresponding to a window $t_w$. The time window may define a time period which is a time range, a date range, a day of the week, or combinations thereof, and may be a recurrent time period (e.g. a Sunday. 9 am to 7 pm, or Sundays from 7 am-11 am). In this example, the time period defined by the time window $t_w$ is a period in which users may be expected to be engaged in recreational activities and recreational travel. Thus the time period is expected to be associated with recreational travel. A date value can be converted to a weekday using known algorithms. The number of probes in the subset for a time window $t_w$ is $|Ps,t_w|$. This corresponds to a count of traversals of the element represented by the segment by devices in the applicable time period defined by the time window.

For reference purposes, the method constructs a similarly sized reference time window $t_r$ for the road segment s defining a reference time period during which mostly non-recreational travel is expected to occur. The number of probes in the reference time window is $|P_s,t_r|$. This corresponds to a count of traversals of the element represented by the segment in the reference time period. In step 70, both numbers are used to determine a scenicity parameter provided by a ratio of the number of probes (i.e. count of traversals) in the time window to the number of probes (i.e. count of traversals) in the reference time window, i.e. a time window use fraction $f_{tw,s}=|P_s,t_w|/|P_s,t_r|$. It has been found that such a scenicity parameter based on such a time window use fraction may correlate well to the scenicity of the element represented by the segment.

Rather than determining a single scenicity parameter for the segment based upon a subset of the identified set of data obtained through filtering with respect to a single time period associated with recreational travel, more than one such scenicity parameter may be obtained based on different respective subsets of the identified set of probes $P_s$. Each such subset is obtained by filtering the identified set of probes using a different time window expected to be associated with recreational travel. In each case, the scenicity parameter may be obtained by determining a ratio of the number of probes in the applicable time window to the number of probes in an appropriate reference time window. Thus the parameter may correspond to, or be based upon the time window use fraction. In these embodiments, different reference time windows may be used for different ones of the subsets of the identified set of probes, being of a similar size.

As in the earlier embodiment, the or each scenicity parameter, this time corresponding to, or based on, the time window use fraction, is used to determine a scenic rating for the segment-step 90. Where a single scenicity parameter has been determined, the scenic rating $r_s$ for the road segments can simply correspond to the scenicity parameter i.e. can correspond to the time window use fraction $r_s=f_{tw,s}$, or, alternatively may be based in some manner thereon. In embodiments in which multiple scenicity parameters are determined based on filtering with respect to different time periods, the scenicity parameters may be combined to provide an overall scenicity rating using an appropriate function, as described in relation to the earlier embodiment, which used filtering by mode of transport.

In step 110, the scenic rating $r_s$ is then associated with the road segment s. The server stores the scenic rating, and data indicative of the road segment with which it is associated. Instead of associating all road segments with a scenic rating, a scenic rating may only be conditionally associated with segments as in the earlier embodiment. In such a case, the determined scenic rating for a segment is assessed, and only when the scenic rating exceeds a threshold value is it associated with the road segment.

It may be desirable, as in the earlier embodiment, to determine a scenic rating in terms of a percentile value. This may be achieved by comparing scencity parameters (or overall scenicity parameters if appropriate) for all road segments being considered e.g. all segments of the electronic map. As in the earlier embodiment, it may be desirable to only associate scenic rating data with segments having a scenic rating over a predefined threshold e.g. set in percentile terms, and/or only displaying an indication of scenicity in relation to such segments. A scenic rating being a value from a scale of predefined scenicity values may be determined. The scenic rating data may be used to display scenic rating information in relation to a map in the manner described by reference to FIGS. 9 and 10.

In accordance with any of the embodiments of the invention, the process of selecting a subset of probes that are likely to be associated with recreational travel can be further improved by considering weather conditions. For example, probes collected during weather conditions that are adverse to recreational activities may be excluded. Such probes may be excluded by using an appropriate time window to obtain the subset of probes where the subset is based on mode of transport, or adjusting the time window used to obtain the subset of probes in embodiments which filter by reference to traversal time (a corresponding adjustment to the reference time window will then be required), so as to exclude times when the weather conditions were adverse to recreational activities.

It is also envisaged that a scenic rating may be based on respective scenic parameters e.g. ratios/use fractions based on subsets of probe data filtered by mode of transport and traversal time. Thus, a scenic rating may be based upon subsets of data obtained by separately filtering in respect of mode of transport and traversal time.

In yet other embodiments, a scenic rating may be based upon a subset of probe data filtered by reference to both mode of transport and traversal time. For example, when filtering by reference to mode of transport to obtain a scenic parameter in respect of a mode of transport e.g. a mode of transport use fraction, it is possible to first apply a time window on the location probes for the road segment. The reference probe data used in obtaining the scenic parameter should then be in respect of a reference time window of corresponding size (and including data for all modes of transport).

Thus, the present invention in its various embodiments provides a method for analysing historic location probe information and automatically determining a scenic rating for road segments. The scenic rating is associated with at least a subset of road segments in a map and stored in a navigation services provider.

The method may extend to the use of the obtained scenic rating data associated with segments of the map in determining a path to a destination through the road network.

Figure 12:
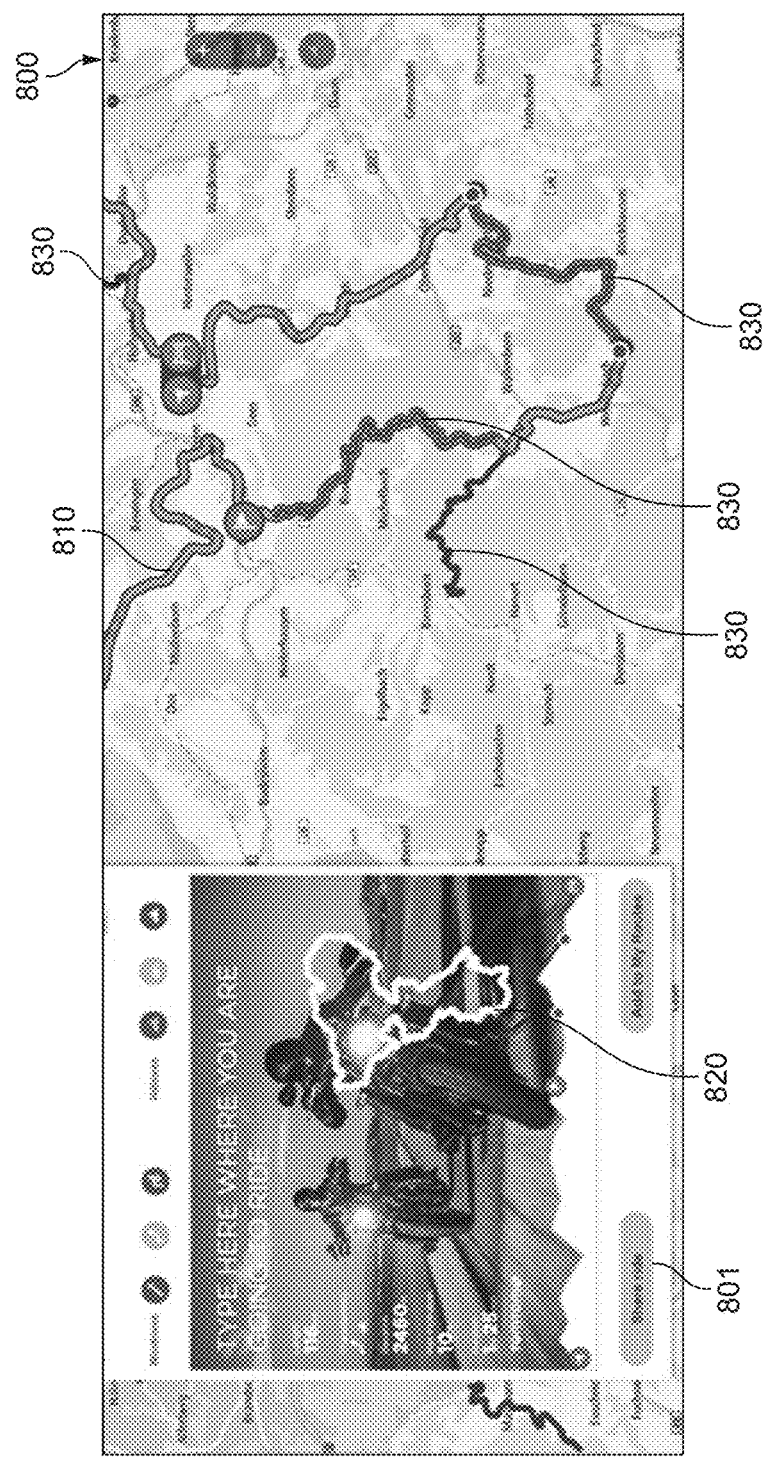
FIG. 12 illustrates the way in which scenic rating data may be used to generate a scenic route.

An example of a navigation system using the scenic rating of road segments is shown in FIG. 12.

FIG. 12 shows a map area 800 upon which an indication of a generated path 510 for a round trip is shown. The path has been generated using scenic rating data for segments to try to obtain a route that is expected to be enjoyable. The inserted image 801 (with the motor cycles) provides an overview of the entire road-trip path 820, while a more detailed view of the generated path 810 is shown on the map in the right side of the Figure. The road segments 830 with a high scenic rating are marked with a darker colour. It may be seen that the determined scenic path includes two scenic road segments 830.

Of course, a path taking into account scenic rating data may be generated by a server running a navigation application rather than by a PND as in the example of FIG. 12. For example, a server may plan a path at the request of a user, which the user may then upload to a PND.

The automated calculation of a scenic rating in accordance with the invention may remove any subjectivity in the assessment of scenicity of segments, as it is based on actual observed behaviour. It also allows a regular update of the scenic rating to reflect changes in the road network that may impact the scenic rating (e.g. new road surface, open to other travel, changes that impact views, and so on).

The invention claimed is:

1. A method of generating a scenic rating for segments of an electronic map, the segments representing navigable elements of a network of navigable elements within a geographic area covered by the electronic map, the method comprising:
    obtaining positional data relating to the movement of a plurality of devices with respect to time in the area;
    for each one of a plurality of segments of the electronic map:
        identifying a set of positional data relating to the movement of devices along the navigable element represented by the segment,
        filtering the identified set of positional data relating to the movement of devices along the navigable element represented by the segment based on one or more criteria to obtain one or more subsets of the identified positional data relating to the movement of devices along the navigable element represented by the segment which may be expected to relate to traversals of the navigable element for recreational purposes, wherein the criteria include mode of transport with which the devices are associated and/or a time of traversal of the navigable element represented by the segment;
        using the or each obtained subset of the positional data to obtain one or more scenicity parameters for the segment; and
        using the one or more obtained scenicity parameters to determine a scenic rating for the segment; and
    for at least some of the plurality of segments for which a scenic rating is determined, generating data indicative of the obtained scenic rating, and associating, in the electronic map, data indicative of the scenic rating with the segment to which the scenic data relates.

2. The method of claim 1, comprising obtaining the one or more scenicity parameters for the segment based on the or each obtained subset of positional data for the navigable element represented by the segment and an applicable reference set of positional data relating to the movement of devices along the navigable element associated with each obtained subset of positional data.

3. The method of claim 2, wherein the method comprises, for each subset of positional data obtained relating to traversals of the navigable element expected to relate to recreational travel, determining a count of traversals of the navigable element according to the obtained subset of positional data, determining a count of traversals of the navigable element according to the applicable reference set of positional data, and determining a scenicity parameter for the segment using the count of traversals of the navigable element according to the obtained subset of positional data and the count of the traversals of the navigable element according to the applicable reference set of positional data.

4. The method of claim 1, wherein the one or more subsets of the identified set of positional data are obtained by filtering the identified set of positional data based on a time of traversal of the segment, wherein the identified set of positional data is filtered such that the subset obtained relates to the movement of devices along the navigable element represented by the segment in one or more given time periods expected to be associated with recreational travel.

5. The method of claim 2, wherein:
    the one or more subsets of the identified set of positional data are obtained by filtering the identified set of positional data based on a time of traversal of the segment, wherein the identified set of positional data is filtered such that the subset obtained relates to the movement of devices along the navigable element represented by the segment in one or more given time periods expected to be associated with recreational travel; and
    each reference set of data comprises positional data relating to the movement of devices along the navigable element in a comparable reference time period expected to be associated with non-recreational travel along the navigable element.

6. The method of claim 1, wherein the one or more subsets of positional data are obtained by filtering the identified set of positional data relating to the movement of devices along the navigable element based on mode of transport with which the devices are associated, wherein the obtained subset of positional data comprises data relating to the traversal of the navigable element by devices associated with one or more selected modes of transport expected to be associated with recreational travel and forming a subset of all modes of transport with which devices traversing the navigable element are associated.

7. The method of claim 6, wherein the one or more selected modes of transport are selected from: pedestrians, motorcycles, electric vehicles, cars, and bicycles.

8. The method of claim 6, wherein a plurality of subsets of the identified positional data are obtained relating to the traversal of the navigable element by devices associated with different respective ones of a plurality of selected modes of transport, wherein each subset is associated with a single mode of transport.

9. The method of claim 2, wherein the one or more subsets of positional data are obtained by filtering the identified set of positional data relating to the movement of devices along the navigable element based on mode of transport with which the devices are associated, wherein the obtained subset of positional data comprises data relating to the traversal of the navigable element by devices associated with one or more selected modes of transport expected to be associated with recreational travel and forming a subset of all modes of transport with which devices traversing the navigable element are associated, and the method comprises:
  for the or each subset of identified positional data obtained comprising data relating to the traversal of the navigable element by devices associated with the one or more selected modes of transport forming a subset of all modes of transport:
    determining a count of traversals of the navigable element according to the obtained subset of positional data, determining a count of traversals of the navigable element according to the applicable reference set of positional data, and determining a scenicity parameter for the navigable element based on the count of traversals of the navigable element according to the obtained subset of positional data and the count of the traversals of the navigable element according to the reference set of positional data, optionally wherein the scenicity parameter is based on a ratio of the count of traversals of the navigable element according to the obtained subset of positional data and the count of the traversals of the navigable element according to the applicable reference set of positional data.

10. The method of claim 9, wherein the reference set of positional data associated with the obtained subset of positional data comprises data relating to the movement of devices associated with all modes of transport with which devices traversing the navigable element are associated.

11. The method of claim 1, wherein, where data indicative of multiple scenicity parameters is obtained for a given segment based on respective ones of multiple subsets of the positional data for the navigable element represented by the segment, the method further comprises obtaining an overall scenic parameter for the segment based on the multiple scenicity parameters, and using the overall scenic parameter in obtaining the scenic rating for the segment.

12. The method of claim 1, comprising using the one or more scenicity parameters determined for the segment, and the one or more scenicity parameters determined for at least some, or each of the other segments of the plurality of segments considered, to determine a scenic rating for the segment indicative of the scenicity of the segment relative to the scenicity of other ones of the at least some of the segments of the navigable network.

13. The method of claim 1, wherein the scenic rating obtained indicates a scenicity level for the navigable element based on a number of discrete levels of a scenicity scale.

14. The method of claim 1, wherein the steps of generating data indicative of the obtained scenic rating for the segment, and associating data indicative of the scenic rating with the segment, is performed for only a subset of the plurality of segments for which a scenic rating is determined, wherein the subset of the plurality of segments are segments having a scenic rating indicating a scenicity above a predefined threshold.

15. The method of claim 1, wherein the scenic rating obtained for the segment is a time dependent scenic rating, and the method further comprises obtaining one or more further time dependent scenic ratings for the segment for respective different time periods.

16. The method of claim 1, wherein the method comprises one or more of: storing the scenic rating data in association with electronic map data indicative of the segment to which the scenic rating relates, displaying a representation of the scenic rating associated with the segment on a representation of the electronic map, and transmitting data indicative of the scenic rating in association with data identifying the segment to which the scenic rating relates.

17. The method of claim 1, wherein the method further comprises using the scenic rating data associated with the at least some of the plurality of the segments in generating a route to a destination expected to have scenic properties.

18. A system for generating a scenic rating for segments of an electronic map, the segments representing navigable elements of a network of navigable elements within a geographic area covered by the electronic map, the system comprising:
  at least one processor; and
  a memory;
  the at least one processor configured to:
    obtain positional data relating to the movement of a plurality of devices with respect to time in the area;
    for each one of a plurality of segments of the electronic map:
      identify a set of positional data relating to the movement of devices along the navigable element represented by the segment;
      filter the identified set of positional data relating to the movement of devices along the navigable element represented by the segment based on one or more criteria to obtain one or more subsets of the identified positional data relating to the movement of devices along the navigable element represented by the segment which may be expected to relate to traversals of the navigable element for recreational purposes, wherein the criteria include mode of transport with which the devices are associated and/or a time of traversal of the navigable element represented by the segment;
      use the or each obtained subset of the positional data to obtain one or more scenicity parameters for the segment; and
      use the one or more obtained scenicity parameters to determine a scenic rating for the segment; and
    for at least some of the plurality of segments representing navigable elements for which a scenic rating is determined, generating data indicative of the obtained scenic rating for the segment, and associating, in the electronic map, data indicative of the scenic rating with the segment to which the scenic rating relates.

19. A non-transitory computer readable storage medium storing program code which, when executed by a processor, causes the processor to perform a method for generating a scenic rating for segments of an electronic map, the segments representing navigable elements of a network of navigable elements within a geographic area covered by the electronic map, the method comprising:
- obtaining positional data relating to the movement of a plurality of devices with respect to time in the area;
- for each one of a plurality of segments of the electronic map:
  - identifying a set of positional data relating to the movement of devices along the navigable element represented by the segment;
  - filtering the identified set of positional data relating to the movement of devices along the navigable element represented by the segment based on one or more criteria to obtain one or more subsets of the identified positional data relating to the movement of devices along the navigable element represented by the segment which may be expected to relate to traversals of the navigable element for recreational purposes, wherein the criteria include mode of transport with which the devices are associated and/or a time of traversal of the navigable element represented by the segment;
  - using the or each obtained subset of the positional data to obtain one or more scenicity parameters for the segment; and
  - using the one or more obtained scenicity parameters to determine a scenic rating for the segment; and
- for at least some of the plurality of segments for which a scenic rating is determined, generating data indicative of the obtained scenic rating, and associating, in the electronic map, data indicative of the scenic rating with the segment to which the scenic rating relates.

20. The method of claim 3, wherein the scenicity parameter is determined based on a ratio of:
- the count of traversals of the navigable element according to the obtained subset of positional data; and
- the count of the traversals of the navigable element according to the applicable reference set of positional data.

21. The method of claim 12, wherein the predefined threshold is a percentile value.

* * * * *